US009551887B2

(12) United States Patent
Ichikawa et al.

(10) Patent No.: US 9,551,887 B2
(45) Date of Patent: Jan. 24, 2017

(54) OPTICAL MODULATOR

(71) Applicant: Sumitomo Osaka Cement Co., Ltd., Chiyoda-ku, Tokyo (JP)

(72) Inventors: Junichiro Ichikawa, Tokyo (JP); Toshio Kataoka, Tokyo (JP); Katsutoshi Kondou, Tokyo (JP)

(73) Assignee: SUMITOMO OSAKA CEMENT CO., LTD., Chiyoda-ku, Tokyo (JP)

( * ) Notice: Subject to any disclaimer, the term of this patent is extended or adjusted under 35 U.S.C. 154(b) by 0 days.

(21) Appl. No.: 14/780,525

(22) PCT Filed: Feb. 27, 2014

(86) PCT No.: PCT/JP2014/054906
§ 371 (c)(1),
(2) Date: Sep. 26, 2015

(87) PCT Pub. No.: WO2014/156459
PCT Pub. Date: Oct. 2, 2014

(65) Prior Publication Data
US 2016/0062155 A1    Mar. 3, 2016

(30) Foreign Application Priority Data

Mar. 26, 2013  (JP) ................. 2013-064923

(51) Int. Cl.
*G02F 1/025* (2006.01)
*G02F 1/03* (2006.01)
(Continued)

(52) U.S. Cl.
CPC ............ *G02F 1/025* (2013.01); *G02F 1/0316* (2013.01); *G02F 1/0356* (2013.01); *G02F 1/225* (2013.01);
(Continued)

(58) Field of Classification Search
CPC ...... G02F 1/025; G02F 1/0136; G02F 1/0356; G02F 2001/0154; G02F 2201/063; G02F 2201/122; G02F 2201/128
See application file for complete search history.

(56) References Cited

U.S. PATENT DOCUMENTS 4,381,139 A * 4/1983 Alferness ............. G02F 1/3134
                                                                  359/245
5,309,531 A * 5/1994 Sheehy ................. G02F 1/0356
                                                                  343/720
(Continued)

FOREIGN PATENT DOCUMENTS

EP      1 333 312 A1   8/2003
JP      H08-122722 A   5/1996
(Continued)

OTHER PUBLICATIONS

K. Noguchi, "Lithium Niobate Modulators", Broadband Optical Modulators: Science, Technology and Applications, A chen and Murphy eds. Chapter6, CRC Press, 2012, p. 151-p. 172.
(Continued)

*Primary Examiner* — Peter Radkowski
(74) *Attorney, Agent, or Firm* — Taft Stettinius & Hollister LLP

(57) ABSTRACT

An optical modulator has a ridge optical waveguide and a modulation electrode. The modulation electrode is composed of a signal electrode to which a modulation signal is supplied, a first ground electrode, and a second ground electrode, the signal electrode has a wide portion having a width wider than the width of the uppermost portion of the ridge optical waveguide, the first ground electrode has a central portion ground electrode component provided on a first surface so as to extend along a first direction, and the second ground electrode has a central portion ground electrode component provided on a second surface so as to
(Continued)

extend along the first direction. The central portion ground electrode components respectively have a first and a second through-holes, and these through-holes overlap the wide portion of the signal electrode as seen in a planar view.

6 Claims, 12 Drawing Sheets

(51) Int. Cl.
*G02F 1/035* (2006.01)
*G02F 1/225* (2006.01)
*G02F 1/015* (2006.01)

(52) U.S. Cl.
CPC . *G02F 2001/0154* (2013.01); *G02F 2201/063* (2013.01); *G02F 2201/122* (2013.01); *G02F 2201/128* (2013.01)

(56) References Cited

U.S. PATENT DOCUMENTS

| | | | |
|---|---|---|---|
| 5,563,965 A | 10/1996 | Madabhushi | |
| 6,111,682 A | 8/2000 | Minakata et al. | |
| 6,310,700 B1* | 10/2001 | Betts | B82Y 10/00 359/2 |
| 7,030,477 B2* | 4/2006 | Ishimura | H01S 5/02212 257/664 |
| 7,079,714 B2* | 7/2006 | Chowdhury | G02F 1/2255 385/3 |
| 7,095,926 B2 | 8/2006 | Sugiyama | |
| 8,600,197 B2* | 12/2013 | Oikawa | G02F 1/0356 385/1 |
| 8,644,647 B2 | 2/2014 | Ichikawa et al. | |
| 2002/0131745 A1* | 9/2002 | Azarbar | G02F 1/225 385/129 |
| 2003/0147575 A1* | 8/2003 | Sugiyama | G02F 1/0305 385/2 |
| 2003/0169478 A1 | 9/2003 | Sugiyama et al. | |
| 2003/0219187 A1* | 11/2003 | Shimotsu | G02F 1/035 385/1 |
| 2004/0136634 A1* | 7/2004 | Chowdhury | G02F 1/2255 385/3 |
| 2005/0047704 A1* | 3/2005 | Ohtake | G02F 1/2255 385/3 |
| 2005/0194663 A1* | 9/2005 | Ishimura | H01S 5/02212 257/666 |
| 2010/0046880 A1* | 2/2010 | Oikawa | G02F 1/0356 385/2 |
| 2010/0158428 A1* | 6/2010 | Kawano | G02F 1/0356 385/3 |
| 2010/0215324 A1* | 8/2010 | Ban | G02B 6/4201 385/88 |
| 2011/0081107 A1* | 4/2011 | Sugiyama | G02F 1/0356 385/2 |
| 2012/0274423 A1 | 11/2012 | Kato | |

FOREIGN PATENT DOCUMENTS

| | | |
|---|---|---|
| JP | H11-101962 A | 4/1999 |
| JP | 2000-267055 A | 9/2000 |
| JP | 2006-084537 A | 3/2006 |
| JP | 2012-010069 A | 1/2012 |
| JP | 2012-023065 A | 2/2012 |
| JP | 2012-253362 A | 12/2012 |
| WO | 2007-114367 A1 | 10/2007 |

OTHER PUBLICATIONS

M.M. Howerton, W.K. Burns, "Broadband traveling wave modulators in LiNb03", RF photonic Technology in Optical Fiber Links, Ed. W.S.C.Chang, Chapter 5, Cambridge University Press, 2002, p. 133-p. 164.
Makoto. Minakata, "Recent Progress of 40 GHz high-speed LiNb03 optical modulator", Proceedings of SPIE, vol. 4532, 2001, p. 16-p. 27.
R. Madabhushi, "Microwave Attenuation Reduction Techniques for Wide-band Ti:LiNb03 Optical Modulators", iEICE Transactions on Electronics vol. E81-C, No. 8, 1998. 08, p. 1321-p. 1327.
International Search Report (PCT Article 18 and Rule 43 and 44), International Application No. PCT/JP2014/054906, Mar. 25, 2014.
Notification of Transmittal of Translation of the International Preliminary Report on Patentability (Chapter I or Chapter II), International Application No. PCT/JP2014/054906, Oct. 8, 2015, with attachments.
Japan Patent Office, Office Action, Issue on May 10, 2016 in Japan, Patent App. No. 2015-017571.

* cited by examiner

Fig.7
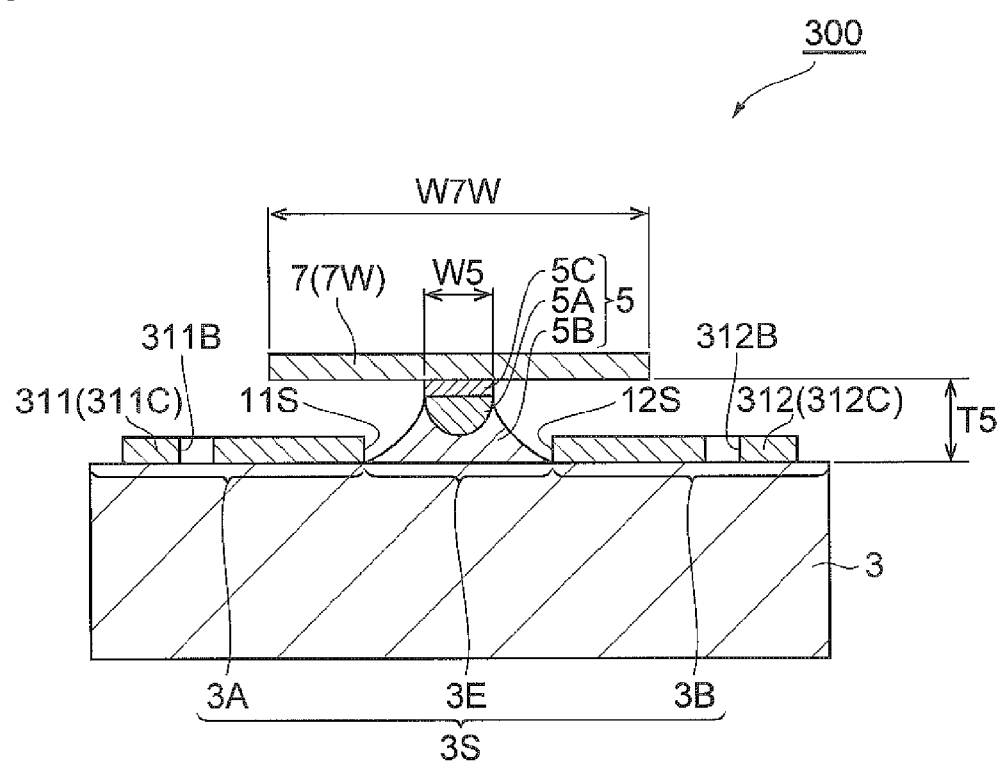
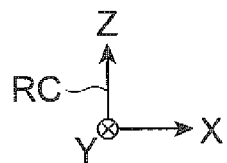

OPTICAL MODULATOR

TECHNICAL FIELD

The present invention relates to an optical modulator.

BACKGROUND ART

Patent Literature Nos. 1 and 2 and Non-Patent Literature Nos. 1 and 2 below disclose optical modulators having a ridge optical waveguide. Each of the optical modulators disclosed in Patent Literature No. 1 and Non-Patent Literature No. 1 below has an overhang-shaped signal electrode provided on the ridge optical waveguide, and each of the optical modulators disclosed in Patent Literature No. 2 and Non-Patent Literature No. 2 below has a signal electrode having a mushroom shape.

CITATION LIST

Patent Literature

Patent Literature No. 1: Japanese Patent Application Laid-open Publication No. 11-101962
Patent Literature No. 2: Japanese Patent Application Laid-open Publication No. 8-122722

Non Patent Literature

Non Patent Literature No. 1: Makoto Minakata, "Recent Progress of 40 GHz high-speed $LiNbO_3$ optical modulator," Proceedings of SPIE, Vol. 4532, Active and Passive Optical Components for WDM Communication, 16 (Jul. 30, 2001) p. 16-27
Non Patent Literature No. 2: R. Madabushi, "Microwave Attenuation Reduction Techniques for Wide-Band Ti:LiNbO₃ Optical Modulators" IEICE TRANS. ELECTRON., VOL. E81-C, NO. 8 AUGUST 1998

SUMMARY OF INVENTION

Technical Problem

In the optical modulator having a ridge optical waveguide disclosed in Patent Literature No. 1, as shown in FIGS. 7 and 11 of the literature, a signal electrode having an overhang shape (that is, a shape having a width wider than the width of the optical waveguide) is provided on the optical waveguide. Further, a ground electrode thinly formed so as not to come into contact with the signal electrode is provided on the side surface of a ridge-shaped portion of the optical waveguide so as to come into contact with the ridge-shaped portion of the optical waveguide. The literature discloses that according to the optical modulator having such a structure, low drive voltage, velocity matching between light which is guided through the optical waveguide and a modulation signal which is applied to the signal electrode, and a low electrode loss can be realized.

However, in the optical modulator of the related art as disclosed in Patent Literature No. 1, there is a problem in that high-speed modulation is difficult for the following reasons.

That is, in order to achieve high-speed modulation, it is necessary to attain impedance matching, specifically, to bring output impedance of an external device for supplying a modulation signal which is applied to a modulation electrode (a signal electrode and a ground electrode) and input impedance of the optical modulator close to the same value (for example, 50Ω).

However, in the optical modulator as disclosed in Patent Literature No. 1, since the distance between the signal electrode having an overhang shape and the ground electrode provided on the side surface of the ridge-shaped portion of the optical waveguide is close, the capacitance between the signal electrode and the ground electrode increased. Due to this, the impedance between the signal electrode and the ground electrode is reduced. Patent Literature No. 1 shows that characteristic impedance is 18.4Ω in a design optimized in the optical modulator as disclosed in the literature. As a result, it becomes difficult to attain the impedance matching between the optical modulator and the external device, and therefore, it becomes difficult to achieve the high-speed modulation.

The same issue also becomes a problem in the optical modulator having a signal electrode overhanging in a mushroom shape disclosed in Patent Literature No. 2. The configuration using the signal electrode overhanging in a mushroom shape disclosed in Patent Literature No. 2 is one of several configurations which are very effective for the realization of velocity matching and a low electrode loss. However, there is a problem in that characteristic impedance is reduced. Non-Patent Literature No. 2 discloses that a problem in the configuration having the signal electrode overhanging in a mushroom shape is divergence of characteristic impedance from 50Ω and the reflection characteristic S11 of an electrode is −10 dB which is inferior.

The adverse effects of the degradation of the reflection characteristic due to the divergence of characteristic impedance from 50Ω can be avoided by incorporation of an impedance converter or an impedance converting circuit into a modulator. However, in an optical modulator in which characteristic impedance is low even with the same amount of power in a drive signal, there is a problem in that the voltage between a signal electrode and a ground electrode in an electrode portion of an acting portion of the signal electrode is lowered. A decrease in the voltage between the signal electrode and the ground electrode is extremely disadvantageous from the viewpoint of high efficiency (low power consumption) drive, particularly, in the case of an optical modulator based on an electro-optic effect (a phenomenon in which a refractive index changes according to an applied electric field, that is, a Pockels effect and an optical Kerr effect), as in an optical modulator in which an optical waveguide is configured of lithium niobate. For this reason, in the high efficiency (low power consumption) drive, it is desirable to design the optical modulator so as to avoid a decrease in characteristic impedance.

The present invention has been made in view of such problems and has an object to provide an optical modulator which has a ridge optical waveguide and a signal electrode having an overhang shape or a mushroom shape and can operate at high speed.

Solution to Problem

The present invention is based on the principle that a portion of a ground electrode component which acts to face a signal electrode is cut out, whereby interelectrode capacity is reduced and characteristic impedance is increased.

That is, in order to solve the above-described problems, an optical modulator according to an aspect of the present invention includes: a base body section having a principal surface; a ridge optical waveguide which is provided on the principal surface of the base body section and extends along a first direction along the principal surface; and a modulation electrode for modulating light which is guided through the ridge optical waveguide. The principal surface of the base body section has an installation surface on which the ridge optical waveguide is provided, and first and second surfaces which are located so as to interpose the installation surface therebetween along a second direction orthogonal to the first direction and along the principal surface. The modulation electrode is composed of a signal electrode to which a modulation signal is supplied, a first ground electrode, and a second ground electrode The signal electrode has a wide portion which is a portion provided on the ridge optical waveguide so as to extend along the first direction and has a width wider than that in the second direction of an uppermost portion of the ridge optical waveguide. The first ground electrode has a first ground electrode component provided on the first surface so as to extend along the first direction, and the second ground electrode has a second ground electrode component provided on the second surface so as to extend along the first direction. The first ground electrode component has at least one first through-hole provided in only a portion in the first direction of the first ground electrode component, and the second ground electrode component has at least one second through-hole provided in only a portion in the first direction of the second ground electrode component. The at least one first through-hole overlaps the wide portion of the signal electrode or faces the wide portion in the second direction as seen in a planar view, and the at least one second through-hole overlaps the wide portion of the signal electrode or faces the wide portion in the second direction as seen in a planar view. The expression, through-hole faces the wide portion, means a state where an electric force which is emitted from the wide portion reaches around an opening of the through-hole, thereby being terminated thereat, and an aspect in which the presence or absence of the through-hole significantly affects the value of capacitance or characteristic impedance of a circuit of a modulation electrode (an aspect in which a relative difference of the value of capacitance or characteristic impedance according to the presence or absence of the through-hole is larger than 0.3% which is the general accuracy of an impedance correction circuit substrate of a high-frequency network analyzer). In addition, there may not be an aspect in which an opening portion of the through-hole or a bottom of the through-hole is directly seen from the wide portion.

In the optical modulator according to the aspect of the present invention, the first ground electrode component and the second ground electrode component respectively have the first through-hole and the second through-hole which overlap the wide portion of the signal electrode or face the wide portion in the second direction as seen in a planar view. For this reason, unlike in a case where the first ground electrode component and the second ground electrode component do not respectively have the first through-hole and the second through-hole, it is possible to reduce the capacity between the signal electrode and the first and second ground electrode components, and therefore, it is possible to increase the characteristic impedance of the modulation electrode. As a result, according to the optical modulator according to the aspect of the present invention, in a case where the signal electrode functions as a lumped-constant type electrode, it is possible to reduce the capacity between the signal electrode and the first and second ground electrode, which prohibits high-frequency drive, and in a case where the signal electrode functions as a travelling wave type electrode, it is possible to avoid a decrease in the characteristic impedance of the modulation electrode, and thus it becomes easy to attain impedance matching between an external device for supplying the modulation signal and the modulator. For this reason, high-speed modulation and high-efficiency drive become possible.

Further, in the optical modulator according to the aspect of the present invention, each of the at least one first through-hole and the at least one second through-hole may have a circular shape, an elliptical shape, a racetrack shape, or a rounded rectangle shape, as seen in a planar view. In this way, an interface which is adjacent to the first through-hole of the first ground electrode component as seen in a planar view (the side surface of the first ground electrode component) and an interface which is adjacent to the second through-hole of the second ground electrode component as seen in a planar view (the side surface of the second ground electrode component) have a curve profile not having corner portions or projection portions. As a result, it becomes difficult for excessive concentration of an electric field on the corner portion or the projection portion to occur in the adjacent interfaces when the modulation signal is applied to the modulation electrode, and therefore, it is possible to suppress a propagation loss of the modulation signal due to the formation of the first and second through-holes.

Further, in the optical modulator according to the aspect of the present invention, the first ground electrode component may have a plurality of first through-holes, the plurality of first through-holes may be provided in order along the first direction, the second ground electrode component may have a plurality of second through-holes, and the plurality of second through-holes may be provided in order along the first direction.

In this way, in a case where the signal electrode functions as a lumped-constant type electrode, it is possible to reduce the capacity between the electrodes which prohibits high-frequency drive, and in a case where the signal electrode functions as a travelling wave type electrode, it is possible to further increase the characteristic impedance of the modulation electrode. For this reason, it becomes easy to attain impedance matching between an external device for supplying the modulation signal and the modulator with a higher degree of accuracy. As a result, according to the optical modulator according to the aspect of the present invention, modulation at higher speed and highly efficient drive become possible.

Further, in the optical modulator according to the aspect of the present invention, the at least one first through-hole may be spaced apart from a side surface on the ridge optical waveguide side of the first ground electrode component as seen in a planar view, and the at least one second through-hole may be spaced apart from a side surface on the ridge optical waveguide side of the second ground electrode component as seen in a planar view.

In this way, in the side surface of the first ground electrode component and the side surface of the second ground electrode component as seen in a planar view, it is possible to prevent a corner portion from being formed on the side of the side surface an the ridge optical waveguide side of the first ground electrode component or the second ground electrode component due to the through-holes being disposed so as to be open to the ridge optical waveguide side. As a result, it becomes difficult for the concentration of an electric field to occur in the side surface when the modulation signal is applied to the modulation electrode, and therefore, it is possible to suppress the propagation loss of the modulation signal due to the formation of the through-hole, Further, in the optical modulator according to the aspect of the present invention, the at least one first through-hole may be spaced apart from the side surface on the ridge optical waveguide side of the first ground electrode component by 2 μm or more as seen in a planar view, and the at least one second through-hole may be spaced apart from the side surface on the ridge optical waveguide side of the second ground electrode component by 2 μm as seen in a planar view. In this way, the separation distance between the modulation electrode and each of the first and second through-holes also increases, and therefore, when the modulation signal is applied to the modulation electrode, it becomes more difficult for the concentration of an electric field to occur in the side surface. As a result, it is possible to further suppress the propagation loss of the modulation signal.

The propagation loss of the modulation signal in an aspect in which through-holes are not provided in the first ground electrode component and the second ground electrode component is about 0.2 dB/[cm (GHz)$^{1/2}$] in the case of the configuration of Non-Patent Literature No. 1, about 0.18 dB/[cm (GHz)$^{1/2}$] in the case of a similar configuration of Patent Literature No. 2, and about 0.15 dB/[cm (GHz)$^{1/2}$] in a case where the configuration of Patent Literature No. 2 is used in combination with a ridge optical waveguide. In a case where the separation distance between the first through-hole and the side surface on the ridge optical waveguide side as seen in a planar view and the separation distance between the second through-hole and the side surface on the ridge optical waveguide side as seen in a planar view are about 20 μm, a degradation width of the propagation loss of the modulation signal when rows of rounded rectangular through-holes having a width of 10 μm and a length of 50 μm are disposed at intervals of 10 μm along the first direction in the first ground electrode component and the second ground electrode component as the first through-hole and the second through-hole is about 0.1 dB/[cm (GHz)$^{1/2}$] in the case of the configuration of Non-Patent Literature No. 1, and about 0.02 dB/[cm (GHz)$^{1/2}$] in the case of a similar configuration of Patent Literature No. 2. If the separation distance is set to be about 30 μm, the propagation loss of the modulation signal due to the formation of the first through-hole and the second through-hole is almost negligible.

In a case where the separation distance between the first through-hole and the side surface of the ridge optical waveguide side as seen in a planar view and the separation distance between the second through-hole and the side surface on the ridge optical waveguide side as seen in a planar view are large, the effect of reducing the capacity between the signal electrode and the first and second ground electrodes and the effect of increasing the characteristic impedance of the modulation electrode due to the formation of the first and second through-holes in the first ground electrode component and the second ground electrode component become relatively low. However, even in such an aspect, the aspect of the present invention provides means with a high practical utility value for adjusting the capacity between the signal electrode and the first and second ground electrodes and the characteristic impedance of the modulation electrode in a case where an optical modulator having the configuration disclosed in Non-Patent Literature No. 1, Non-Patent Literature No. 2, or the like is manufactured by using an optical waveguide made of a material having a high dielectric constant, such as lithium niobate.

An increase width of the characteristic impedance of the modulation signal in a case where rows of rounded rectangular through-holes having a width of 10 μm and a length of 50 μm are disposed at intervals of 10 μm along the first direction in the first ground electrode component and the second ground electrode component as the first through-hole and the second through-hole greatly depends on the width of the ridge optical waveguide in the case of the configuration of Non-Patent Literature No. 1, and in a case where the width of the optical waveguide is set to be in a range of 6 μm to 8 μm which is a realistic value in this configuration, it is possible to increase the characteristic impedance of the modulation signal by a value in a range of about 5Ω to 10Ω. In the case of a configuration similar to that of Non-Patent Literature No. 2, it is possible to increase the characteristic impedance of the modulation signal by a value in a range of about 2Ω to 5Ω, although it greatly depends on the shape of the signal electrode or the shape of an overhanging signal side surface.

If the separation distance between the first through-hole and the side surface of the ridge optical waveguide side as seen in a planar view and the separation distance between the second through-hole and the side surface on the ridge optical waveguide side as seen in a planar view are set to be about 30 μm, the effect of reducing the capacity between the signal electrode and the first ground electrode and second ground electrode and the effect of increasing the characteristic impedance of the modulation electrode become lower. However, while the adjustment of several Ω of the characteristic impedance is possible, the propagation loss of the modulation signal due to the formation of the first through-hole and the second through-hole is almost negligible, and therefore, the practical utility thereof is high.

Further, in the optical modulator according to the aspect of the present invention, the first ground electrode component and the second ground electrode component may be provided substantially line-symmetrically with respect to an optical axis of the ridge optical waveguide as seen in a planar view. In this way, the scale of an analytical calculation of the characteristic of the optical modulator may be small, and furthermore, deviations of the stress and the strain of a substrate at the time of a change in the temperature of the optical modulator are avoided, and thus acquisition of stability of an operation of the optical modulator can be expected.

Even if the disposition positions of the first and second through-holes are asymmetric, the effect of reducing the capacity between the signal electrode and the first and second ground electrodes and the effect of increasing the characteristic impedance of the modulation electrode can be obtained. However, for convenience of design, it is possible to perform a symmetrical disposition such that the scale of an analytical calculation of a characteristic may be small. If the first and second through-holes are disposed with a central portion of the signal electrode as a line of symmetry, a calculation scale of a finite element analysis or a propagation analysis can be completed in half the time. Further, due to such a symmetrical disposition, asymmetric deviations of the stress and the strain of a substrate are dispersed, and thus acquisition of stability of an operation of the optical modulator can be expected. Further, in the symmetrical disposition of the first and second through-holes, there is also the advantage that in design and an analysis of stress and strain, the scale of an analytical calculation may be small.

A plurality of rows of first and second through-holes may be formed, and it goes without saying that in this case, the effect of reducing the capacity between the signal electrode and the first and second ground electrodes or increasing the characteristic impedance of the modulation electrode is higher. However, the propagation loss of a control signal is raised due to the formation of the first and second through-holes, and therefore, it is desirable to form the first and second through-holes in a requisite minimum number in a range in which the propagation loss characteristic of the control signal is permitted.

In the formation of the first and second through-holes, it is possible to perform the formation thereof in consideration of securing line width resolution in a photolithography process or reproducibility in a plating process. It is possible to form the first and second through-holes at positions spaced apart from an edge on the ridge optical waveguide side of the first ground electrode or an edge on the ridge optical waveguide side of the second ground electrode by a width which is the same as or greater than the width of the ridge optical waveguide.

Advantageous Effects of Invention

According to the present invention, an optical modulator which is a modulator including a ridge optical waveguide and an overhang-shaped or mushroom-shaped signal electrode that can operate at high speed is provided. In particular, the present invention is effective for solving the problem of a decrease in characteristic impedance manifest in an optical modulator using an optical waveguide made of lithium niobate disclosed in Non-Patent Literature No. 1 or Non-Patent Literature No. 2.

BRIEF DESCRIPTION OF DRAWINGS

FIG. 7 is a cross-sectional view of the optical modulator taken along line VII-VII of FIG. 6.

DESCRIPTION OF EMBODIMENTS

Figure 1:
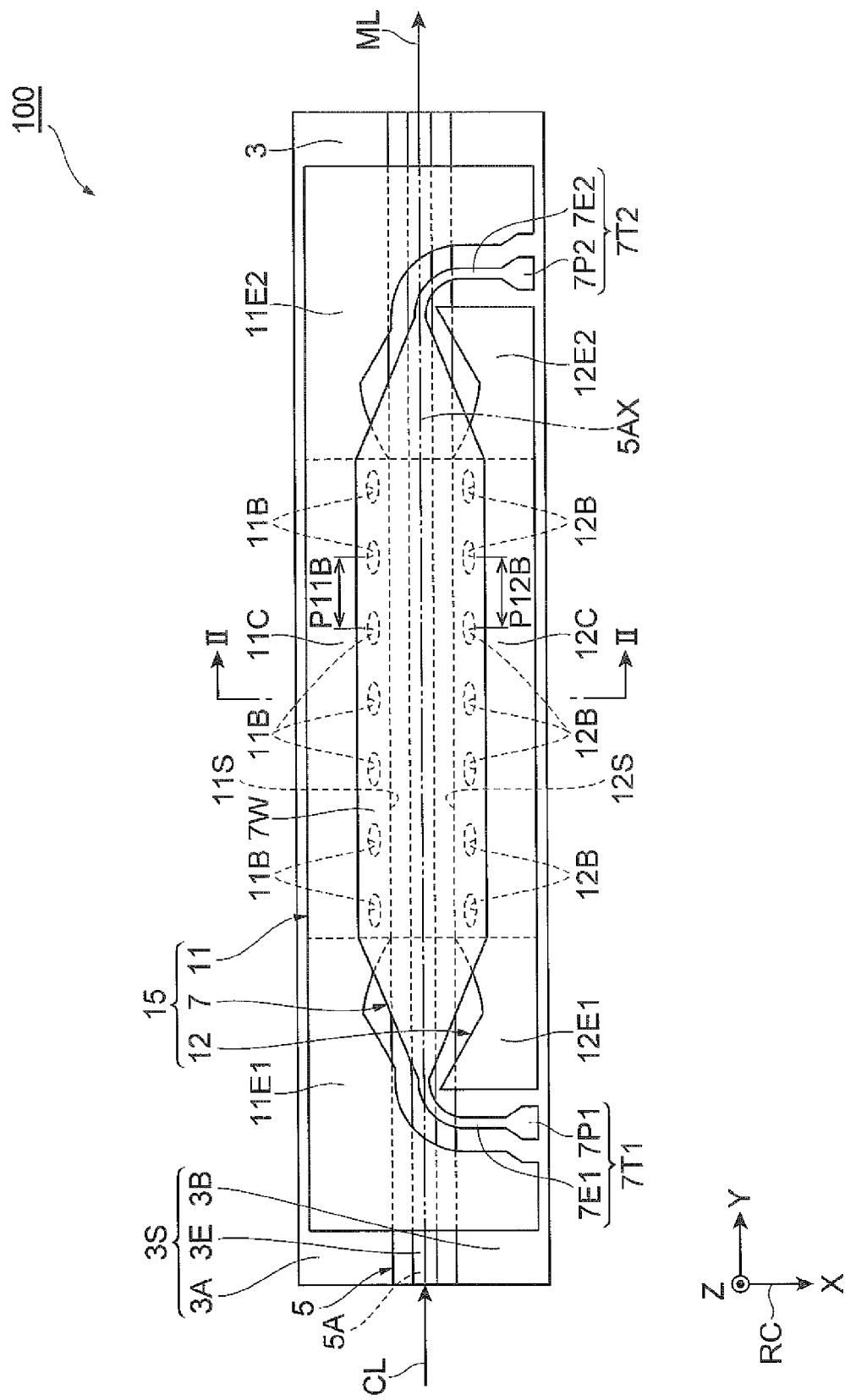
FIG. 1 is a plan view showing the configuration of an optical modulator according to a first embodiment.

Hereinafter, optical modulators according to embodiments will be described in detail with reference to the accompanying drawings. In addition, in each drawing, the same reference numerals are used in identical elements, if possible. Further, the dimensional ratios in a component and between the components in the drawings are arbitrarily set for the sake of visibility of the drawings.

The features of the optical modulators of the embodiments which are described below are based on the principle that a portion of a ground electrode component which acts to face a signal electrode is cut out, whereby the capacity between these electrodes is lowered and characteristic impedance is raised, and embodiments which are particularly effective for improvement in the characteristics of an optical modulator having a high practical value are described below. In addition, in the optical modulators of the embodiments, a technique is incorporated for suppressing the propagation loss of the signal electrode which is the harmful effect of the introduction of the principle, and the optical modulators are characterized as having an industrially valuable technique.

(First Embodiment)

Figure 2:
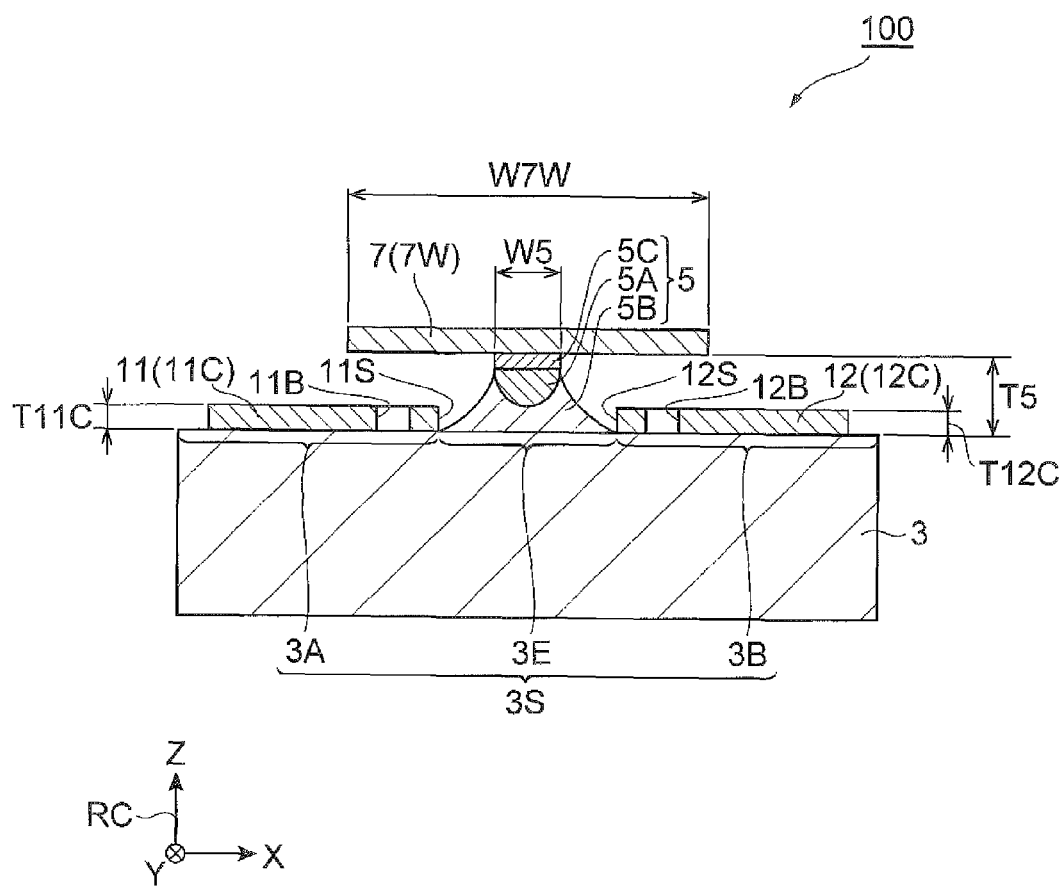
FIG. 2 is a cross-sectional view of the optical modulator taken along line II-II of FIG. 1.
Figure 3:
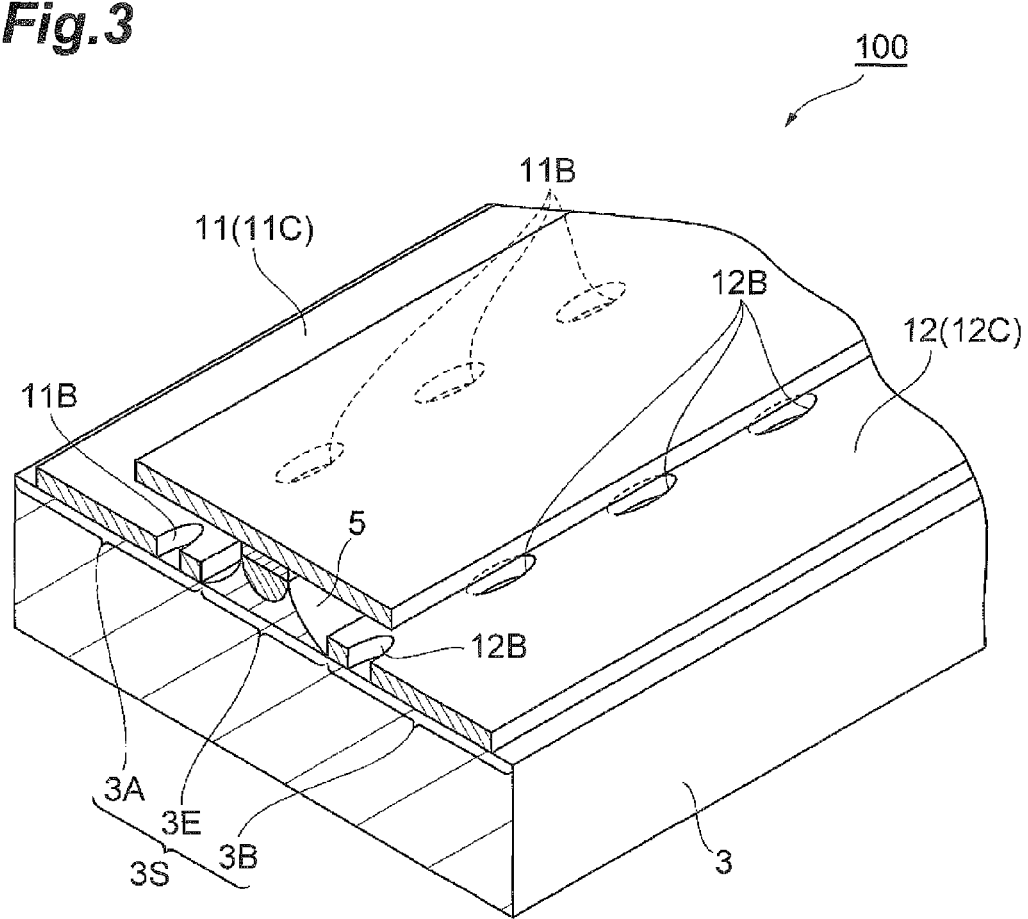
FIG. 3 is a perspective view of the optical modulator in the vicinity of the cross-section in FIG. 2.

FIG. 1 is a plan view showing the configuration of an optical modulator according to a first embodiment of the present invention, FIG. 2 is a cross-sectional view of the optical modulator taken along line II-II of FIG. 1, and FIG. 3 is a perspective view of the optical modulator in the vicinity of the cross-sectional view of FIG. 2.

As shown in FIGS. 1 to 3, an optical modulator 100 of this embodiment is a device for modulating input light CL that is continuous wave light which is introduced by an optical fiber or the like, and outputting modulated light wave ML to the outside. The optical modulator 100 may be provided with a base body section 3, a ridge optical waveguide 5, and a modulation electrode 15.

The base body section 3 is a plate-shaped member which is configured of a dielectric material exhibiting an electro-optic effect, such as lithium niobate ($LiNbO_3$), for example. The base body section 3 has a substantially flat principal surface 3S. In FIG. 1, a Cartesian coordinate system RC is shown, and an X-axis and a Y-axis are set in a direction parallel to the principal surface 3S and a Z-axis is set in a direction orthogonal to the principal surface 3S. Also in FIG. 2 and each of subsequent drawings, the Cartesian coordinate system RC is shown so as to correspond to FIG. 1, as necessary.

The base body section 3 has a longitudinal shape extending in a Y-axis direction (a first direction). The principal surface 3S of the base body section 3 is composed of an installation surface 3E on which the ridge optical waveguide 5 is provided, a first surface 3A, and a second surface 3B. The installation surface 3E, the first surface 3A, and the second surface 3B are surfaces extending in the Y-axis direction and extend from one end in a Y-axis negative direction of the base body section 3 to the other end in a Y-axis positive direction. The first surface 3A and the second surface 3B are located so as to interpose the installation surface 3E therebetween along an X-axis direction (a second direction).

In this embodiment, the ridge optical waveguide 5 is provided on the entire installation surface 3E of the principal surface 3S. The ridge optical waveguide 5 is an optical waveguide having a shape protruding in a Z-axis direction and extending along the Y-axis direction. The input light CL is introduced from the end face in the Y-axis negative direction of a core portion 5A of the ridge optical waveguide 5 into the optical modulator 100, guided through the core portion 5A along an optical axis 5AX of the core portion 5A, and output from the end face in the Y-axis positive direction of the core portion 5A to the outside of the optical modulator 100 as the modulated light wave ML.

The ridge optical waveguide 5 is composed of the core portion 5A, a clad portion 5B, and a buffer layer 5C which respectively extend along the Y-axis direction. The core portion 5A is made of a material having a higher refractive index than the clad portion 5B. Each of the core portion 5A and the clad portion 5B is configured of a dielectric material exhibiting an electro-optic effect. The core portion 5A is configured of lithium niobate (LiNbO$_3$) containing metal such as titanium (Ti) for example, and the clad portion 5B is configured of, for example, lithium niobate (LiNbO$_3$). The buffer layer 5C is made of a material having a lower refractive index than the core portion 5A and for example, a dielectric material such as a silicon oxide (SiO$_2$). The buffer layer 5C is interposed between the core portion 5A and a signal electrode 7, thereby reducing the propagation loss of light which is guided through the core portion 5A, due to the signal electrode 7. The ridge optical waveguide 5 may not have the buffer layer 5C.

A structure composed of the base body section 3 and the ridge optical waveguide 5 provided on the base body section 3 as described above can be obtained as follows, for example. That is, a plate-shaped initial substrate which is configured of a dielectric material such as lithium niobate (LiNbO$_3$), for example, is prepared, and metal such as titanium (Ti) is diffused in a region to become the core portion 5A in the vicinity of the principal surface of the initial substrate. Subsequently, a dielectric film made of a dielectric material configuring the buffer layer 5C is formed on the entire principal surface, and thereafter, the initial substrate and the dielectric film are etched so as to form regions which become the ridge optical waveguide 5 and the base body section 3, whereby the structure can be obtained. Alternatively, the structure can also be obtained by preparing the base body section 3 and forming the ridge optical waveguide 5 on the installation surface 3E of the principal surface 3S of the base body section 3.

It is also possible to configure the base body section 3 and the ridge optical waveguide 5 with different materials, for example by configuring the base body section 3 with an optical material such as SiO$_2$, Al$_2$O$_3$, optical glass, or optical resin and configuring the ridge optical waveguide 5 with a dielectric material exhibiting an electro-optic effect, such as lithium niobate. This configuration can be obtained, for example, by performing bonding of a base body section material and a ridge optical waveguide material or formation of a film of a ridge optical waveguide material on a base body section material, and thereafter, etching these materials so as to form regions which become the ridge optical waveguide 5 and the base body section 3. In this case, it is necessary to select a combination of these materials such that the refractive index of the base body section material becomes smaller than the refractive index of the ridge optical waveguide material in the wavelength and the polarization conditions of incident light which is used in an optical modulator. Further, in the case of this configuration, since the entire ridge optical waveguide 5 functions as a core portion of an optical waveguide, a portion having a high refractive index (the core portion 5A) may not be formed in the ridge optical waveguide 5.

The modulation electrode 15 has the signal electrode 7, a first ground electrode 11, and a second ground electrode 12. The modulation electrode 15 is an electrode having a shape extending along an X-Y plane and is configured of a material which is a good conductor at a high frequency, for example, metal such as gold (Au), silver (Ag), or copper (Cu), or a superconducting material. The modulation electrode 15 is provided in order to modulate the input light CL which is guided through the ridge optical waveguide 5.

In this embodiment, the signal electrode 7 has an input-side transmission portion 7T1, a wide portion 7W, and an output-side transmission portion 7T2. The input-side transmission portion 7T1 is composed of an input pad 7P1 and a signal transmission portion 7E1. The input pad 7P1 is provided, for example, in the vicinity of an end portion on the X-axis positive side of the principal surface 3S of the base body section 3 and functions as an input portion to which a modulation signal that is supplied from an external device is input. A high-frequency electrical signal of, for example, 10 GHz or more is included in the modulation signal. One end of the signal transmission portion 7E1 is electrically connected to the input pad 7P1, and the signal transmission portion 7E1 transmits the modulation signal input to the input pad 7P1, to the wide portion 7W. The portion in the vicinity of the wide portion 7W of the signal transmission portion 7E1 has a shape in which the width as seen in a planar view (in a case of being viewed from the Z-axis direction) gradually increases so as to come close to the width of the wide portion 7W as it approaches the wide portion 7W, and has a structure for preventing the occurrence of a reflection loss due to impedance mismatch.

One end of the wide portion 7W is electrically connected to the other end of the signal transmission portion 7E1. The wide portion 7W is provided on the ridge optical waveguide 5 so as to extend along the Y-axis direction. A width W7W in the X-axis direction of the wide portion 7W is larger than a width W5 in the X-axis direction of an uppermost portion of the ridge optical waveguide 5. For this reason, in a cross section orthogonal to the Y-axis direction, the wide portion 7W has an overhang shape as shown in FIGS. 1 to 3 or a mushroom shape, with respect to the ridge optical waveguide 5. Here, the expression, the wide portion 7W has an overhang shape, means that the wide portion 7W of the signal electrode 7 overhangs with respect to the ridge optical waveguide 5 from the upper surface of the ridge optical waveguide 5 so as to become wider than the width W5 of the ridge optical waveguide 5 in the second direction and has a cross-sectional structure such as an overhang being mounted on the upper surface of the ridge optical waveguide 5. Further, the expression, the wide portion 7W has a mushroom shape, means a state where the wide portion 7W of the signal electrode 7 has a base portion coming into contact with the upper surface of the ridge optical waveguide 5, and an upper portion being a portion above the base portion and having a wider width than the base portion, that is, a state where the wide portion 7W of the signal electrode 7 has an overhang portion (the above-described upper portion) protruding in the second direction with respect to the ridge optical waveguide 5 and the wide portion 7W is made to be wider than the width 5w of the ridge optical waveguide 5, and means that the cross-sectional shape of the wide portion 7W is a mushroom shape provided on the upper surface of the ridge optical waveguide 5.

The wide portion 7W functions as a modulating portion which modulates light which is guided through the core portion 5A. Specifically, an electric field can be applied to the core portion 5A of the ridge optical waveguide 5 by the wide portion 7W, and the refractive index of the core portion 5A changes according to the intensity of the applied electric field, the kind of a material configuring the core portion 5A, a dielectric polarization direction of the core portion 5A, and the like. If the modulation signal is supplied to the signal electrode 7, the wide portion 7W applies an electric field according to the modulation signal to the core portion 5A of the ridge optical waveguide 5 and changes the refractive index of the core portion 5A according to the modulation signal. In this way, the input light CL is modulated according to the modulation signal.

The shape in a cross section orthogonal to the Y-axis of the wide portion 7W is not limited to a flat planar shape as an aspect of the overhang shape as shown in FIG. 2 and may be, for example, a rectangular shape, an elliptical shape, or a shape which extends in a gradually overhanging inverted trapezoidal shape, may be a shape overhanging in a mushroom shape, or may be an intermediate shape between these, a hybrid shape of these two shapes, or the like.

The output-side transmission portion 7T2 is composed of an output pad 7P2 and a signal transmission portion 7E2. One end of the signal transmission portion 7E2 is electrically connected to the other end of the wide portion 7W, and the signal transmission portion 7E2 transmits the modulation signal transmitted through the wide portion 7W, to the output pad 7P2. The portion in the vicinity of the wide portion 7W of the signal transmission portion 7E2 has a shape in which the width as seen in a planar view gradually decreases as it approaches the output pad 7P2, and has a structure for preventing the occurrence of the reflection loss due to impedance mismatch. The other end of the signal transmission portion 7E2 is electrically connected to the output pad 7P2. The output pad 7P2 is provided, for example, in the vicinity of an end portion on the X-axis positive side of the principal surface 3S of the base body section 3 and functions as an output portion from which the modulation signal is output. The output pad 7P2 may be electrically connected to a resistor provided in a termination portion (not shown) which is an electrical termination of the modulation signal.

The first ground electrode 11 and the second ground electrode 12 are electrodes which are connected to a ground potential. Each of the first ground electrode 11 and the second ground electrode 12 is an electrode having a shape extending along the X-Y plane and is provided on the principal surface 3S of the base body section 3. Each of the first ground electrode 11 and the second ground electrode 12 is configured of metal such as gold (Au), for example.

The first ground electrode 11 is composed of one end portion ground electrode component 11E1, a central portion ground electrode component 11C as a first ground electrode component, and the other end portion ground electrode component 11E2. One end portion ground electrode component 11E1 is an electrode component on the Y-axis negative side direction side of the first ground electrode 11, the central portion ground electrode component 11C is an electrode component of a central portion in the Y-axis direction of the first ground electrode 11, and the other end portion ground electrode component 11E2 is an electrode component on the Y-axis positive side direction side of the first ground electrode 11.

Similarly, the second ground electrode 12 is composed of one end portion ground electrode component 12E1, a central portion ground electrode component 12C as a second ground electrode component, and the other end portion ground electrode component 12E2. One end portion ground electrode component 12E1 is an electrode component in the Y-axis negative side direction of the second ground electrode 12. The central portion ground electrode component 12C is an electrode component of a central portion in the Y-axis direction of the second ground electrode 12. The other end portion ground electrode component 12E2 is an electrode component in the Y-axis positive side direction of the second ground electrode 12.

One end portion ground electrode component 11E1 and one end portion ground electrode component 12E1 respectively extend from the vicinity of the input pad 7P1 to one of the ends in the Y-axis negative side direction of the central portion ground electrode component 11C and the central portion ground electrode component 12C and are electrically connected to the other one of the ends. The other end portion ground electrode component 11E2 and the other end portion ground electrode component 12E2 respectively extend from the vicinity of the output pad 7P2 to the other ends in the Y-axis positive side direction of the central portion ground electrode component 11C and the central portion ground electrode component 12C and are electrically connected to the other ends. The first ground electrode 11 and the second ground electrode 12 can be electrically connected to an external element having a ground potential, in regions in the vicinity of the input pad 7P1 of one end portion ground electrode component 11E1 and one end portion ground electrode component 12E1 and can be electrically connected to an external element having a ground potential, in regions in the vicinity of the output pad 7P2 of the other end portion ground electrode component 11E2 and the other end portion ground electrode component 12E2.

The central portion ground electrode component 11C is provided on the first surface 3A of the principal surface 3S of the base body section 3 so as to extend along the Y-axis direction, that is, so as to extend along an extending direction of the wide portion 7W. In this embodiment, the central portion ground electrode component 11C is in contact with the ridge optical waveguide 5 in the X-axis direction on the principal surface 3S of the base body section 3. For this reason, as seen in a planar view, a portion of the central portion ground electrode component 11C overlaps the wide portion 7W. A thickness T11C in the Z-axis direction of the central portion ground electrode component 11C is lower than a height T5 in the Z-axis direction of the ridge optical waveguide 5. For this reason, the central portion ground electrode component 11C is spaced apart from the wide portion 7W in the Z-axis direction. The thickness T11C of the central portion ground electrode component 11C is, for example, 1 μm or more and 3 μm or less, and the height T5 of the ridge optical waveguide 5 can be set to be, for example, 3 μm or more and 10 μm or less.

The central portion ground electrode component 11C has a plurality of first through-holes 11B. The first through-hole 11B is a hole penetrating the central portion ground electrode component 11C along the Z-axis direction. Each of the first through-holes 11B is provided in a region which overlaps the wide portion 7W as seen in a planar view, of the central portion ground electrode component 11C. For this reason, each of the first through-holes 11B overlaps the wide portion 7W as seen in a planar view. Further, each of the first through-holes 11B is spaced apart from a side surface 11S on the ridge optical waveguide 5 side of the central portion ground electrode component 11C in the X-axis direction as seen in a planar view. Further, each of the first through-holes 11B has a shape not having corner portions, for example, a circular shape, an elliptical shape, a racetrack shape, or a rounded rectangle shape, as seen in a planar view. In addition, the racetrack shape refers to a shape in which an outer edge thereof has first and second arc portions and first and second straight portions, the first and second arc portions are disposed such that an opening of the first arc portion and an opening of the second arc portion face each other, one end of the first arc portion and one end of the second arc portion which is on the one end side are connected by the first straight portion, and the other end of the first arc portion and the other end of the second arc portion are connected by the second straight portion. The plurality of first through-holes 11B may have the same planar shape, and some or all of the first through-holes 11B may have different planar shapes.

The plurality of first through-holes 11B are provided in intervals P11B in order along the Y-axis direction. In order to achieve the effect of reducing the capacity between the signal electrode 7 and the first and second ground electrodes 11 and 12 and the effect of increasing the characteristic impedance of the modulation electrode 15, the first through-holes 11B having the same shape may not be disposed at intervals along the first direction. For example, a plurality of types of the first through-holes 11B having different shapes may be disposed, and a plurality of types of first through-holes 11B may be disposed discretely or at predetermined intervals along an extending direction of the signal electrode 7. Rather than discretely disposing the first through-holes 11B or disposing a plurality of types of the first through-holes 11B having different shapes, disposing at intervals the plurality of first through-holes 11B having the same shape is advantageous in terms of a design because the scale of an analytical calculation of characteristics may be small, and design analysis becomes easier. In this way, it becomes easy to prevent the characteristic degradation of a loss of a propagation signal due to unintended impedance mismatch.

In addition, in the case of a structure in which the first through-holes 11B are provided at intervals, since the structure acts as a band-pass filter circuit corresponding to a specific frequency, a specific frequency signal is coupled to the band-pass filter circuit, and thus there is a possibility that a signal propagating through the signal electrode may degrade. The degradation of the modulation signal can be avoided by making the interval, at which the first through-holes 11B are provided, be ¼ or less of the wavelength of a main frequency component of the modulation signal (the wavelength of the frequency component in the band-pass filter circuit).

Similarly, the central portion ground electrode component 12C is provided on the second surface 3B of the principal surface 3S of the base body section 3 so as to extend along the Y-axis direction, that is, so as to extend along the extending direction of the wide portion 7W. In this embodiment, the central portion ground electrode component 12C is in contact with the ridge optical waveguide 5 in the X-axis direction on the principal surface 3S of the base body section 3. For this reason, as seen in a planar view, a portion of the central portion ground electrode component 12C overlaps the wide portion 7W. A thickness T12C in the Z-axis direction of the central portion ground electrode component 12C is lower than the height T5 in the Z-axis direction of the ridge optical waveguide 5. For this reason, the central portion ground electrode component 12C is spaced apart from the wide portion 7W in the Z-axis direction. The thickness T12C of the central portion ground electrode component 12C is, for example, 1 µm or more and 3 µm or less.

The central portion ground electrode component 12C has a plurality of second through-holes 12B. The second through-hole 12B is a hole penetrating the central portion ground electrode component 12C along the Z-axis direction. Each of the second through-holes 12B is provided in a region which overlaps the wide portion 7W as seen in a planar view, of the central portion ground electrode component 12C. For this reason, each of the second through-holes 12B overlaps the wide portion 7W as seen in a planar view. Further, each of the second through-holes 12B is spaced apart from a side surface 12S on the ridge optical waveguide 5 side of the central portion ground electrode component 12C in the X-axis direction as seen in a planar view. Further, each of the second through-holes 12B has a shape not having corner portions, for example, a circular shape, an elliptical shape, a racetrack shape, or a rounded rectangle shape, as seen in a planar view.

The plurality of second through-holes 12B are provided at intervals P12B in order along the Y-axis direction. The considerations about the interval of disposition and the shape of the second through-hole are the same as in the case of the first through-hole 11B described above. In addition, in the case of an aspect in which the first through-hole 11B and the second through-hole 12B are line-symmetrical with respect to the optical axis 5AX of the core portion 5A as seen in a planar view, this is preferable because a calculation scale in a design analysis may be small.

In the optical modulator 100 according to this embodiment as described above, the central portion ground electrode component 11C and the central portion ground electrode component 12C respectively have the first through-holes 11B and the second through-holes 12B overlapping the wide portion 7W of the signal electrode 7 as seen in a planar view (refer to FIGS. 1 and 2). For this reason, unlike in a case where the central portion ground electrode component 11C and the central portion ground electrode component 12C do not respectively have the first through-holes 11B and the second through-holes 12B, it is possible to reduce the capacitance between the signal electrode 7 and the first and second ground electrodes 11 and 12, and therefore, it is possible to increase the characteristic impedance of the modulation electrode 15.

As a result, according to the optical modulator 100 according to this embodiment, in a case where the signal electrode 7 functions as a lumped-constant type electrode, it is possible to reduce the capacity between the signal electrode 7 and the first and second ground electrodes 11 and 12, which prohibits high-frequency drive, and in a case where the signal electrode 7 functions as a travelling wave type electrode, it is possible to avoid a decrease in the characteristic impedance of the modulation electrode 15, and thus it becomes easy to attain impedance matching between an external device for supplying the modulation signal and the modulator. For this reason, the high-speed modulation and high-efficiency drive become possible.

In this manner, the technique which is adopted in this embodiment is a technique which is effective when forming a design so as to increase the characteristic impedance of the modulation electrode 15 and when performing a design for reducing the capacity between the signal electrode 7 and the first and second ground electrodes 11 and 12. Therefore, the technique is particularly effective when manufacturing the optical modulator 100 by using the base body section 3 made of a material having high relative permittivity such as lithium niobate (the relative permittivity of lithium niobate has an anisotropy and the relative permittivity is 28 and 45). Further, the technique is particularly effective when manufacturing the optical modulator 100 which is driven by a high-frequency control signal which includes a component in a GHz band, or a broadband control signal.

Further, in particular, in the optical modulator 100 according to this embodiment, each of the first through-hole 11B and the second through-hole 12B is provided so as to overlap the wide portion 7W as seen in a planar view (refer to FIG. 1). In this way, the total capacitance between the signal electrode 7 and the first and second ground electrodes 11 and 12 is reduced by an amount equivalent to the capacity of a parallel plate capacitor corresponding to the total area of the first through-hole 11B and the second through-hole 12B, and therefore, it is possible to further increase the characteristic impedance of the modulation electrode 15.

Further, in the optical modulator 100 according to this embodiment, each of the first through-hole 11B and the second through-hole 12B has a shape not having corner portions, such as a circular shape or an elliptical shape, as seen in a planar view (refer to FIGS. 1 and 3). Due to this, an interface adjacent to the first through-hole 11B of the central portion ground electrode component 11C as seen in a planar view and an interface adjacent to the second through-hole 12B of the central portion ground electrode component 12C as seen in a planar view have a curve profile not having corner portions. As a result, it is difficult for the concentration of an electric field to occur in the adjacent interfaces when the modulation signal is applied to the modulation electrode 15, and therefore, it is possible to suppress the propagation loss of the modulation signal.

Further, in the optical modulator 100 according to this embodiment, the central portion ground electrode component 11C has the plurality of first through-holes 11B, the plurality of first through-holes 11B are provided in order along the Y-axis direction, the central portion ground electrode component 12C has the plurality of second through-holes 12B, and the plurality of second through-holes 12B are provided in order along the Y-axis direction (refer to FIGS. 1 and 3).

In this way, it is possible to further increase the impedance of the modulation electrode 15, and therefore, it becomes easy to attain impedance matching between the external device for supplying the modulation signal and the optical modulator 100 with a higher degree of accuracy. As a result, according to the optical modulator 100 according to this embodiment, the modulation at higher speed becomes possible.

Further, in the optical modulator 100 according to this embodiment, the first through-hole 11B is spaced apart from the side surface 11S on the ridge optical waveguide 5 side of the central portion ground electrode component 11C as seen in a planar view, and the second through-hole 12B is spaced apart from the side surface 12S on the ridge optical waveguide 5 side of the central portion ground electrode component 12C as seen in a planar view (refer to FIG. 1).

In this way, it is possible to prevent corner portions from being formed in the side surface 11S of the central portion ground electrode component 11C and the side surface 12S of the central portion ground electrode component 12C as seen in a planar view. As a result, it becomes difficult for the concentration of an electric field to occur in the side surfaces 11S and 12S when the modulation signal is applied to the modulation electrode 15, and therefore, it is possible to suppress the propagation loss of the modulation signal.

Further, in the optical modulator 100 according to this embodiment, the central portion ground electrode component 11C is in contact with the ridge optical waveguide 5 in the X-axis direction on the principal surface 3S of the base body section 3, and the central portion ground electrode component 12C is in contact with the ridge optical waveguide 5 in the X-axis direction on the principal surface 3S of the base body section 3 (refer to FIGS. 1 to 3). In this way, the region of the central portion ground electrode component 11C and the region of the central portion ground electrode component 12C overlapping the wide portion 7W as seen in a planar view becomes larger, and therefore, the ratio of the power of control signals which are transmitted through gaps between the wide portion 7W and the region of the central portion ground electrode component 11C and the region of the central portion ground electrode component 12C overhanging the wide portion 7W in a planar view becomes larger, and thus the speed of the modulation signal rises, whereby velocity matching between light which is guided through the ridge optical waveguide 5 and the modulation signal which is applied to the signal electrode 7 becomes possible. In addition, the surface areas of the central portion ground electrode component 11C and the central portion ground electrode component 12C are widened, and thus the concentration of an electric field can be avoided, and therefore, a low electrode loss can be more easily realized.

In this way, an increase in interelectrode capacity and a decrease in characteristic impedance, which are the defects of a configuration using a signal electrode overhanging in an overhang shape in an optical modulator having a configuration of the related art, can be improved by respectively providing the first through-hole 11B and the second through-hole 12B in the central portion ground electrode component 11C and the central portion ground electrode component 12C in the optical modulator 100 of this embodiment.

Further, in the optical modulator 100 according to this embodiment, each of the first through-holes 11B can be spaced apart from the side surface 11S on the ridge optical waveguide 5 side of the central portion ground electrode component 11C by 2 μm or more in the X-axis direction as seen in a planar view, and each of the second through-holes 12B can be spaced apart from the side surface 12S on the ridge optical waveguide 5 side of the central portion ground electrode component 12C by 2 μm or more in the X-axis direction as seen in a planar view. A skin depth due to a skin effect in a frequency of 10 GHz, of gold, silver, or copper which is a good conductor which is generally used as an electrode material of an optical modulator corresponding to a high frequency is less than approximately 1 μm. In a possible aspect described above, each of the first through-holes 11B and each of the second through-holes 12B are respectively spaced apart from the side surfaces 11S and 12S on the ridge optical waveguide 5 side of the central portion ground electrode component 11C and the central portion ground electrode component 12C by the surface layer depth or more as seen in a planar view. In this way, even if an electric field is concentrated in the vicinity of each of the first through-holes 11B and each of the second through-holes 12B of the central portion ground electrode component 11C and the central portion ground electrode component 12C due to an edge effect, a sufficient skin depth for a high-frequency current is secured, and therefore, it is possible to suppress the occurrence of the propagation loss of the modulation signal.

Further, the separation distance in the X-axis direction between each of the first through-holes 11B and the side surface 11S on the ridge optical waveguide 5 side of the central portion ground electrode component 11C as seen in a planar view is not particularly limited from the viewpoint of suppressing the occurrence of a propagation loss and may be appropriately determined according to the design of the capacity between the signal electrode 7 and the first and second ground electrodes 11 and 12 or the characteristic impedance of the modulation electrode 15. If the separation distance is large, the effects of reducing the capacity between the signal electrode 7 and the first and second ground electrodes 11 and 12 and increasing the characteristic impedance of the modulation electrode 15 tend to decrease. However, since each of the first through-holes 11B and each of the second through-holes 12B are provided so as to overlap the wide portion 7W as seen in a planar view, the dependence of the effects on the separation distance is relatively small. The same applies to the separation distance in the X-axis direction between each of the first through-hole 11B and the second through-hole 12B and the side surface 12S on the ridge optical waveguide 5 side of the central portion ground electrode component 12C. Therefore, a decrease in the capacity between the signal electrode 7 and the first and second ground electrodes 11 and 12 and an increase in the characteristic impedance of the modulation electrode 15 can be adjusted primarily by the total area as seen in a planar view of the first through-holes 11B and the second through-holes 12B, rather than the separation distance.

Further, in the optical modulator 100 according to this embodiment, the central portion ground electrode component 11C and the central portion ground electrode component 12C can be provided substantially line-symmetrically with respect to the optical axis of the core portion 5A of the ridge optical waveguide 5 as seen in a planar view (refer to FIG. 1). In this way, the scale of an analytical calculation necessary for a design of a characteristic may be small. Furthermore, deviations of the stress and the strain of a substrate at the time of a change in temperature, which are caused by uneven disposition of the first through-holes 11B and the second through-holes 12B, are avoided, and thus acquisition of stability of an operation of the optical modulator can be expected.

Second Embodiment

Next, a second embodiment of the present invention will be described. In the second embodiment and each of subsequent embodiments, the differences from other embodiments are mainly described, and the same elements as elements of other embodiments are denoted by the same reference numerals and a detailed description thereof is sometimes omitted.

Figure 4:
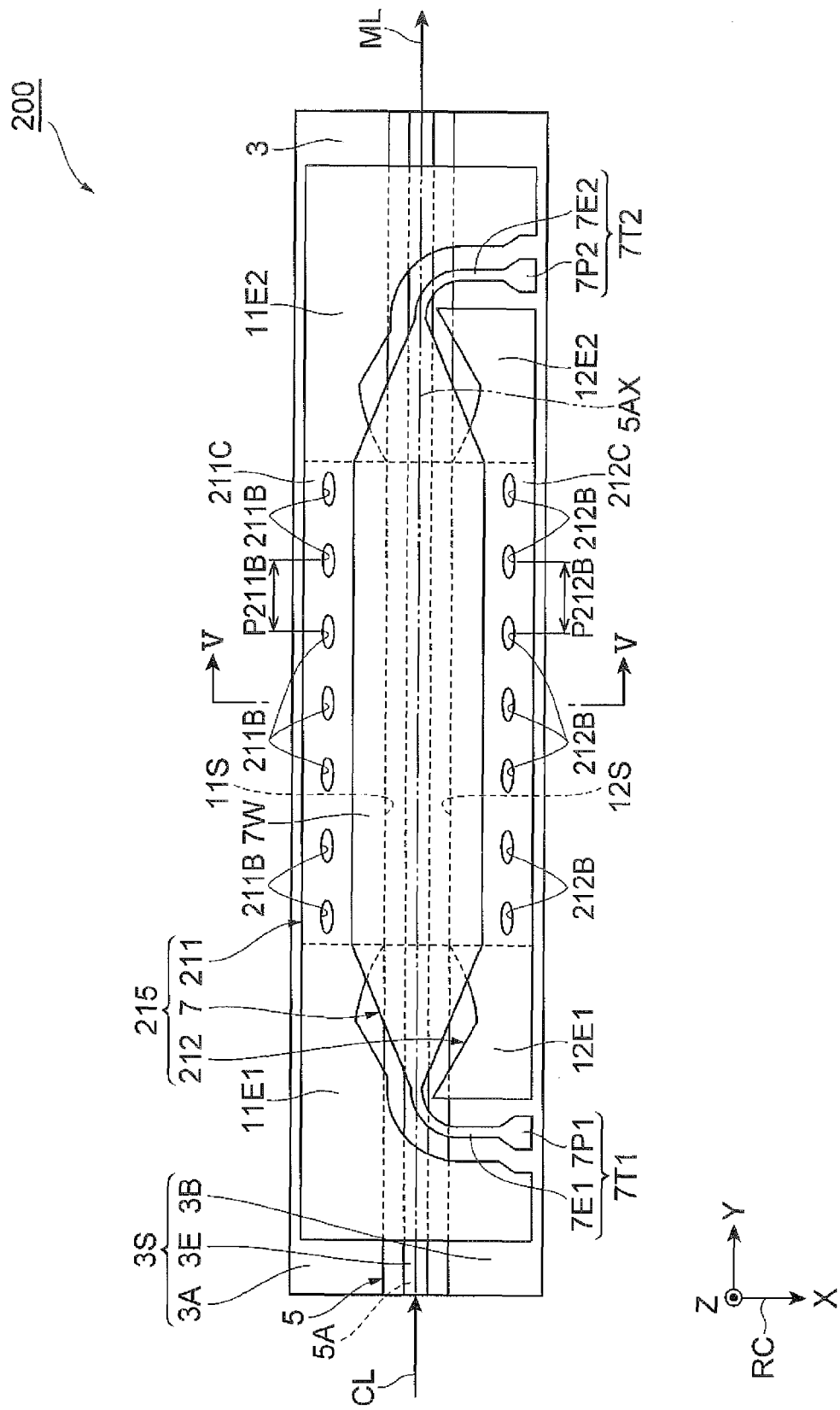
FIG. 4 is a plan view showing the configuration of an optical modulator according to a second embodiment.
Figure 5:
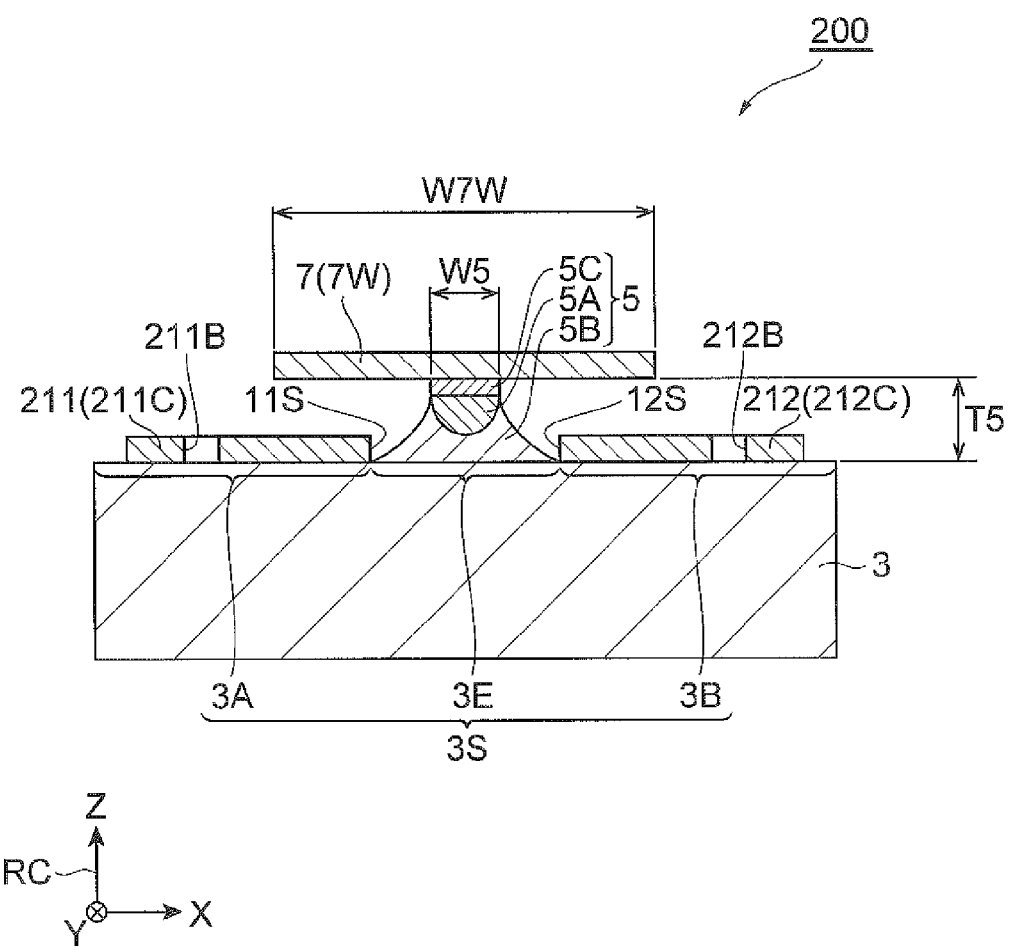
FIG. 5 is a cross-sectional view of the optical modulator taken along line V-V of FIG. 4.

FIG. 4 is a plan view showing the configuration of an optical modulator according to the second embodiment, and FIG. 5 is a cross-sectional view of the optical modulator taken along line V-V of FIG. 4. An optical modulator 200 of this embodiment is different from the optical modulator 100 of the first embodiment in terms of a position where the first through-hole is provided and a position where the second through-hole is provided.

That is, as shown in FIGS. 4 and 5, a modulation electrode 215 of this embodiment has a first ground electrode 211, the signal electrode 7, and a second ground electrode 212. Further, a central portion ground electrode component 211C that the first ground electrode 211 has is different from the central portion ground electrode component 11C of the first embodiment in terms of a position where a plurality of first through-holes are formed. Specifically, a plurality of first through-holes 211B of this embodiment are provided in a region which does not overlap the wide portion 7W as seen in a planar view, of the central portion ground electrode component 211C. For this reason, each of the first through-holes 211B faces the wide portion 7W in the X-axis direction as seen in a planar view.

Similarly, a central portion ground electrode component 212C that the second ground electrode 212 has is different from the central portion ground electrode component 12C of the first embodiment in terms of a position where a plurality of second through-holes are formed. Specifically, a plurality of second through-holes 212B of this embodiment are provided in a region which does not overlap the wide portion 7W as seen in a planar view, of the central portion ground electrode component 212C. For this reason, each of the second through-holes 212B faces the wide portion 7W in the X-axis direction as seen in a planar view.

The plurality of first through-holes 211B are provided at intervals P211B in order along the Y-axis direction, similarly to the first through-holes 11B of the first embodiment. From the viewpoint of expressing the effect of reducing the capacity between the signal electrode 7 and the first and second ground electrodes 211 and 212 and the effect of increasing the characteristic impedance of the modulation electrode 215, the first through-holes 211B having the same shape may not be disposed at intervals along the first direction. For example, a plurality of types of first through-holes 211B having different shapes may be disposed, and a plurality of types of first through-holes 211B may be disposed discretely or at predetermined intervals along the extending direction of the signal electrode 7. Rather than discretely disposing the first through-holes 211B or disposing a plurality of types of first through-holes having different shapes, disposing at intervals the plurality of first through-holes 211B having the same shape is advantageous in terms of design because the scale of an analytical calculation of a characteristic may be small, and design analysis becomes easier. In this way, it is easy to prevent the characteristic degradation of a loss of a propagation signal due to unintended impedance mismatch.

In addition, in the case of a structure in which the first through-holes 211B are provided at intervals, since the structure acts as a band-pass filter circuit corresponding to a specific frequency, a specific frequency signal is coupled to the band-pass filter circuit, and thus there is a possibility that a signal propagating through the signal electrode may degrade. The degradation of the modulation signal can be avoided by making the interval, at which the first through-holes 211B are provided, be ¼ or less of the wavelength of a main frequency component of the modulation signal (the wavelength of the frequency component in the band-pass filter circuit). The same applies to the plurality of second through-holes 212B.

By using the optical modulator 200 according to this embodiment, it becomes easy to attain impedance matching between an external device for supplying the modulation signal and the optical modulator 200, based on the same reasons as in the optical modulator 100 of the first embodiment, and therefore, high-speed modulation becomes possible.

Further, in the optical modulator 200 according to this embodiment, the plurality of first through-holes 211B are provided in a region which does not overlap the wide portion 7W as seen in a planar view, of the central portion ground electrode component 211C, and the plurality of second through-holes 212B are provided in a region which does not overlap the wide portion 7W as seen in a planar view, of the central portion ground electrode component 212C (refer to FIGS. 4 and 5). In this way, the modulation electrode 215 and the first through-hole 211B are spaced far apart from each other, and therefore, it becomes difficult for an edge effect to occur in an edge of the first through-hole 211B and it is possible to reduce the propagation loss of the modulation signal associated with the presence of the first through-hole 211B.

However, in the case of a structure in which the cross-sectional shape of the modulation electrode 215 is an flat planar overhang shape, if the separation distance is large, the effects of reducing the capacity between the signal electrode 7 and the first and second ground electrodes 211 and 212 and increasing the characteristic impedance of the modulation electrode 215 become small. In an aspect in which the base body section and the ridge optical waveguide are configured of lithium niobate, in this embodiment, velocity matching and low-loss propagation of the modulation signal are able to be realized, for example, when the width W7W of the wide portion 7W of the signal electrode 7 is set to be in a range of three times to five times the width W5 of the ridge optical waveguide 5. However, if the separation distance is set to be about eight times the width W5 of the ridge optical waveguide portion, there is a case where the effects of reducing interelectrode capacity and increasing characteristic impedance become relatively weak.

On the other hand, in the case of a structure in which the cross-sectional shape of the modulation electrode 215 is a rectangular shape, an elliptical shape, an inverted trapezoidal shape, a mushroom shape, or the like and thus the area of a portion corresponding to the side surface is large, the situation is different. The region which does not overlap the wide portion 7W as seen in a planar view, of the central portion ground electrode component 211C, corresponds to a region which substantially faces a side portion of the modulation electrode 215. For this reason, forming the first through-hole 211B in the portion is effective for decreasing the capacity between the signal electrode 7 and the first and second ground electrodes 211 and 212 and increasing the characteristic impedance of the modulation electrode 215. In particular, in a case where rather than the width W7W of the wide portion 7W of the signal electrode 7, a height T607W (refer to FIG. 12) of the signal electrode is large, the effect is great. Even if the first through-hole 211B is formed in a region which overlaps the wide portion 7W as seen in a planar view, of the central portion ground electrode component 211C, or formed in a non-overlapping region, the effects of reducing the capacity between the signal electrode 7 and the first and second ground electrodes 211 and 212 and increasing the characteristic impedance of the modulation electrode 215 can be obtained. However, the first through-hole 211B being formed in a non-overlapping region is advantageous in terms of a modulation signal loss being small.

Third Embodiment

Figure 6:
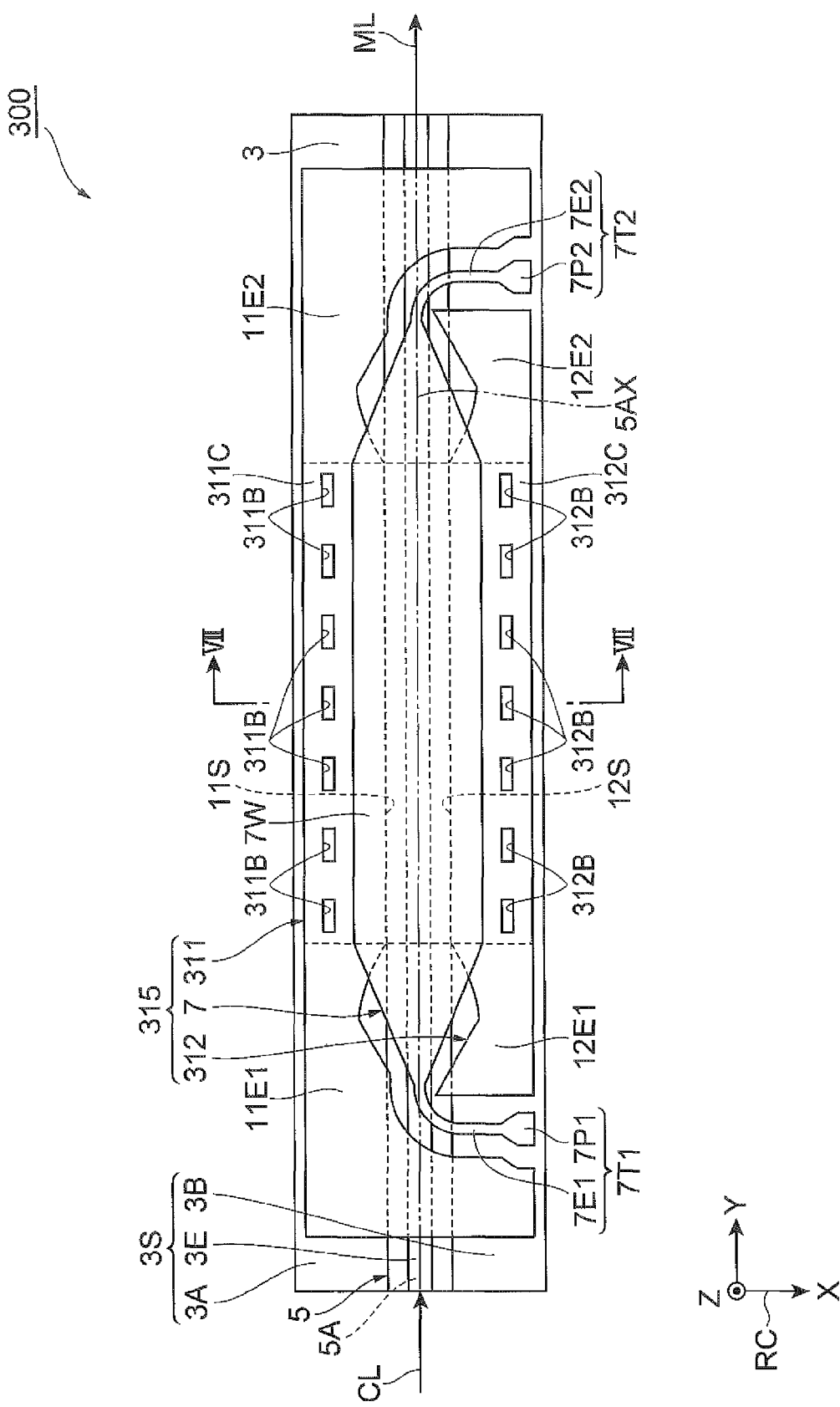
FIG. 6 is a plan view showing the configuration of an optical modulator according to a third embodiment.

Next, a third embodiment of the present invention will be described. FIG. 6 is a plan view showing the configuration of an optical modulator according to the third embodiment, and FIG. 7 is a cross-sectional view of the optical modulator taken along line VII-VII of FIG. 6. An optical modulator 300 of the third embodiment is different from the optical modulator 200 of the second embodiment in terms of the planar shapes of the first through-hole and the second through-hole.

That is, as shown in FIGS. 6 and 7, a modulation electrode 315 of this embodiment has a first ground electrode 311, the signal electrode 7, and a second ground electrode 312. Then, the planar shape of each of a plurality of first through-holes 311B provided in a central portion ground electrode component 311C that the first ground electrode 311 has is a shape having corner portions, such as a rectangular shape, unlike the first through-hole 211B (refer to FIG. 4) of the second embodiment. Similarly, the planar shape of each of a plurality of second through-holes 312B provided in a central portion ground electrode component 312C that the second ground electrode 312 has is a shape having corner portions, such as a rectangular shape, unlike the second through-hole 212B (refer to FIG. 4) of the second embodiment.

By using the optical modulator 300 according to this embodiment, it becomes easy to attain impedance matching between an external device for supplying the modulation signal and the optical modulator 300, based on the same reasons as in the optical modulator 100 of the first embodiment, and therefore, high-speed modulation becomes possible.

Further, in the optical modulator 300 according to this embodiment, the planar shape of each of the plurality of first through-holes 311B is a shape having corner portions, such as a rectangular shape, and the planar shape of each of the plurality of second through-holes 312B is a shape having corner portions, such as a rectangular shape (refer to FIG. 6), and therefore, it is possible to significantly reduce the calculation scale of a characteristic analysis necessary for design. Each of the first through-holes 311B and each of the second through-holes 312B have a simple structure which does not include a curved portion, and therefore, unlike in a case where the through-holes include a curved portion, it is not necessary to subdivide the size of an element in a finite element analysis, and thus the calculation scale is significantly reduced. Further, an effect in which significant labor-saving of model input of a calculation is attained is exhibited.

In a case where the first through-hole 311B and the second through-hole 312B having corner portions are formed in the regions which overlap the wide portion 7W of the signal electrode 7 as seen in a planar view, of the central portion ground electrode component 311C and the central portion ground electrode component 312C, the distance between each of the first through-hole 311B and the second through-hole 312B and the wide portion 7W is close, and therefore, there is a case where the influence of an edge effect increases and there is a possibility that the loss of the signal electrode 7 may increase. However, as in this embodiment, in a case where the first through-hole 311B and the second through-hole 312B are formed in the regions which do not overlap the wide portion 7W of the signal electrode 7 as seen in a planar view, of the central portion ground electrode component 311C and the central portion ground electrode component 312C, the distance between each of the first through-hole 311B and the second through-hole 312B and the wide portion 7W is large, and therefore, the influence of an edge effect is slight and the loss of the signal electrode is reduced.

Fourth Embodiment

Figure 8:
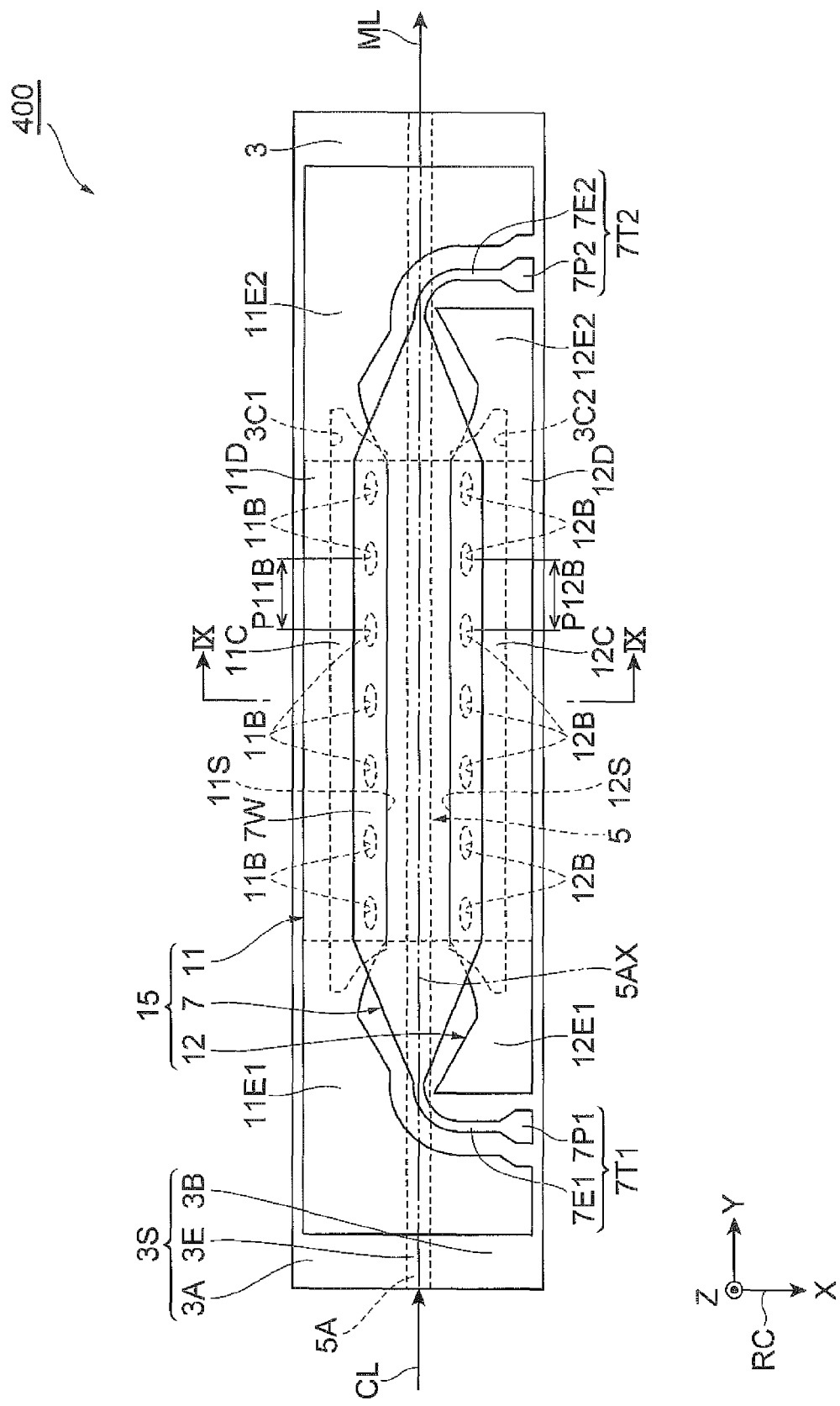
FIG. 8 is a plan view showing the configuration of an optical modulator according to a fourth embodiment.
Figure 9:
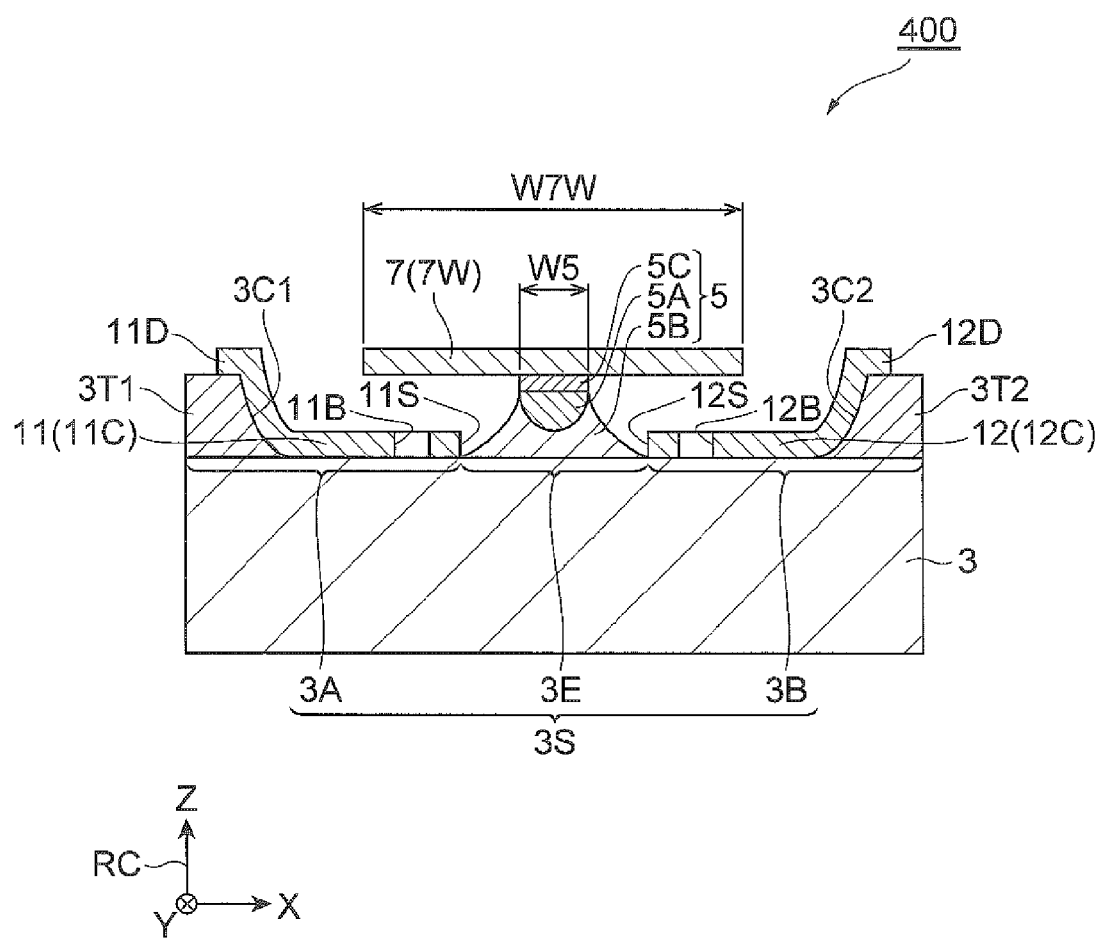
FIG. 9 is a cross-sectional view of the optical modulator taken along line IX-IX of FIG. 8.

Next, a fourth embodiment of the present invention will be described. FIG. 8 is a plan view showing the configuration of an optical modulator according to the fourth embodiment, and FIG. 9 is a cross-sectional view of the optical modulator taken along line IX-IX of FIG. 8. An optical modulator 400 of the fourth embodiment is different from the optical modulator 100 (refer to FIGS. 1 to 3) of the first embodiment in that the optical modulator 400 is further provided with a first terrace section 3T1 and a second terrace section 3T2, the first ground electrode 11 is further provided with an on-terrace ground electrode component 11D, and the second ground electrode 12 is further provided with an on-terrace ground electrode component 12D.

The first terrace section 3T1 is a terrace-shaped member provided on the first surface 3A of the principal surface 3S, and the second terrace section 3T2 is a terrace-shaped member provided on the second surface 3B of the principal surface 3S. The first terrace section 3T1 and the second terrace section 3T2 have substantially the same height as the ridge optical waveguide 5. A first concave portion 3C1 is defined on the first surface 3A and the installation surface 3E by the first terrace section 3T1 and the ridge optical waveguide 5. A second concave portion 3C2 is defined on the second surface 3B and the installation surface 3E by the second terrace section 3T2 and the ridge optical waveguide 5. Each of the first concave portion 3C1 and the second concave portion 3C2 has a shape extending along the Y-axis direction as seen in a planar view, and the shape of the ridge optical waveguide 5 of this embodiment is defined by the first concave portion 3C1 and the second concave portion 3C2.

Each of the first terrace section 3T1 and the second terrace section 3T2 is configured of a dielectric material exhibiting an electro-optic effect, such as lithium niobate ($LiNO_3$), and may be configured of the same material as the base body section 3. A structure composed of the base body section 3, the ridge optical waveguide 5, the first terrace section 3T1, and the second terrace section 3T2 can be obtained as follows, for example. That is, a plate-shaped initial substrate which is configured of a dielectric material such as lithium niobate ($LiNbO_3$), for example, is prepared and metal such as titanium (Ti) is diffused in a region to become the core portion 5A in the vicinity of the principal surface of the initial substrate. Subsequently, a dielectric film made of a dielectric material configuring the buffer layer 5C is formed on the entirety of the principal surface, and thereafter, the initial substrate and the dielectric film are etched so as to form regions which become the ridge optical waveguide 5, the base body section 3, the first terrace section 3T1, and the second terrace section 3T2, whereby the structure can be obtained. Alternatively, the structure can also be obtained by preparing the base body section 3 and forming the ridge optical waveguide 5 on the installation surface 3E of the principal surface 3S of the base body section 3 and forming the first terrace section 3T1 and the second terrace section 3T2 on the first surface 3A and the second surface 3B.

The on-terrace ground electrode component 11D of the first ground electrode 11 is made of, for example, the same metal material as the central portion ground electrode component 11C and is provided on the side surface and the upper surface of the first terrace section 3T1 so as to be electrically connected to the central portion ground electrode component 11C. Similarly, the on-terrace ground electrode component 12D of the second ground electrode 12 is made of, for example, the same metal material as the central portion ground electrode component 12C and is provided on the side surface and the upper surface of the second terrace section 3T2 so as to be electrically connected to the central portion ground electrode component 12C. The thickness of the on-terrace ground electrode component 11D on the upper surface of the first terrace section 3T1 can be set to be thicker than the thickness of the central portion ground electrode component 11C and can be set to be, for example, 10 µm or more and 80 µm or less. Similarly, the thickness of the on-terrace ground electrode component 12D on the upper surface of the second terrace section 3T2 can be set to be thicker than the thickness of the central portion ground electrode component 12C and can be set to be, for example, 10 µm or more and 80 µm or less.

By using the optical modulator 400 according to this embodiment, it becomes easy to attain impedance matching between an external device for supplying the modulation signal and the optical modulator 400, based on the same reasons as in the optical modulator 100 of the first embodiment, and therefore, high-speed modulation becomes possible.

Further in the optical modulator 400 according to this embodiment, since the optical modulator 400 has the on-terrace ground electrode component 11D electrically connected to the central portion ground electrode component 11C and provided on the first terrace section 3T1, and the on-terrace ground electrode component 12D electrically connected to the central portion ground electrode component 12C and provided on the second terrace section 3T2, it becomes easy to form the on-terrace ground electrode component 12D and the signal electrode 7 at the same height or a similar height. In this way, there is an advantage in that it is easy to perform a characteristic inspection using high-frequency probes of wire bonding, flip chip bonding, and ground-signal-ground (GSG) types when packaging a modulator chip in a case. Further, in a case of manufacturing a ridge optical waveguide by using lithium niobate, reactive ion etching or mechanical processing is mainly used. However, when using any technique, the area of a processing portion being small is convenient in terms of processing, and therefore, it is desirable that the first surface 3A and the second surface 3B are formed in a requisite minimum number. For this reason, a configuration in which portions equivalent to the first and second terrace sections 3T1 and 3T2 remain unprocessed, as in this embodiment, is a realistic configuration.

Fifth Embodiment

Figure 10:
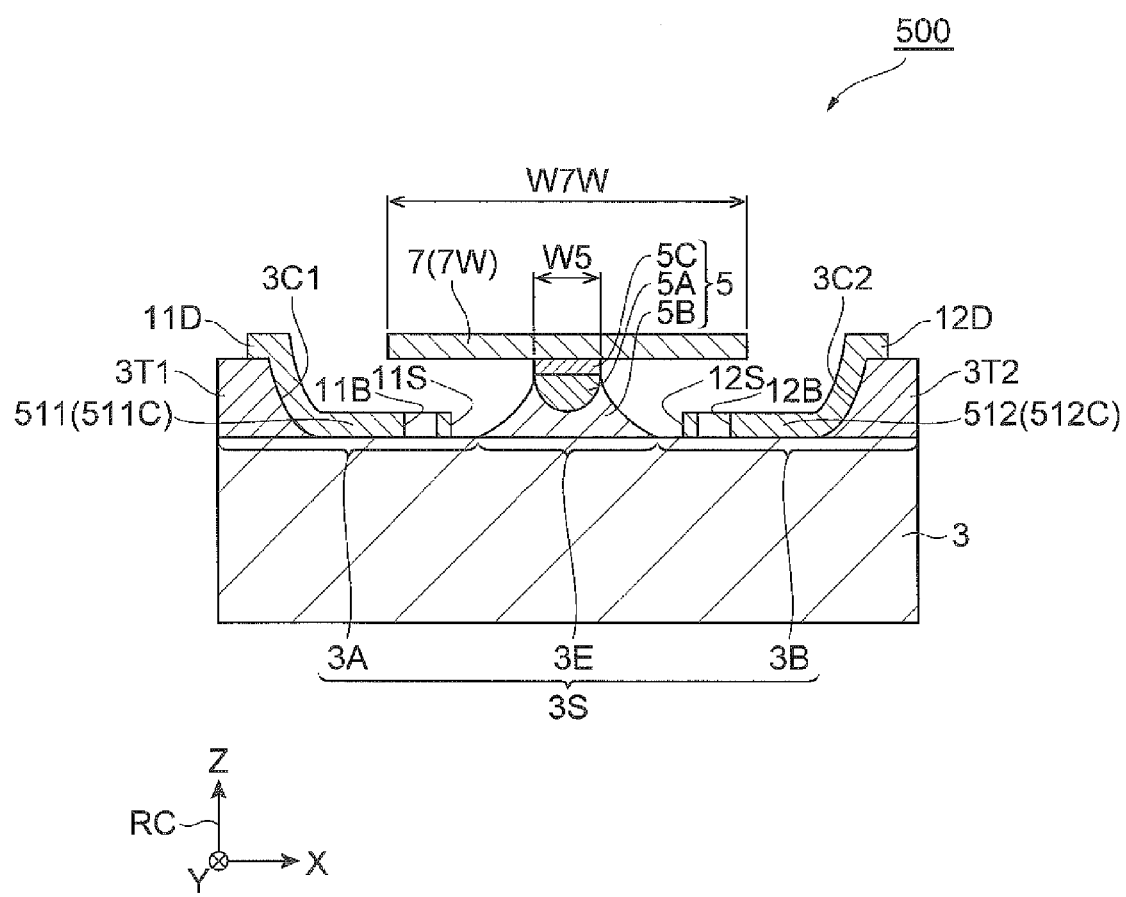
FIG. 10 is a cross-sectional view of an optical modulator according to a fifth embodiment.

Next, a fifth embodiment of the present invention will be described. FIG. 10 is a cross-sectional view of an optical modulator according to the fifth embodiment and is a diagram corresponding to FIG. 9 of the fourth embodiment. An optical modulator 500 of the fifth embodiment is different from the optical modulator 400 (refer to FIGS. 8 and 9) of the fourth embodiment in the terms of aspects of the central portion ground electrode component of the first ground electrode and the central portion ground electrode component of the second ground electrode.

That is, as shown in FIG. 10, in the optical modulator 500 of this embodiment, a central portion ground electrode component 511C that the first ground electrode 511 has is spaced apart from the ridge optical waveguide 5 in the X-axis direction on the principal surface 3S of the base body section 3. Similarly, a central portion ground electrode component 512C that the second ground electrode 512 of this embodiment has is spaced apart from the ridge optical waveguide 5 in the X-axis direction on the principal surface 3S of the base body section 3. The separation distance in the X-axis direction between the central portion ground electrode component 511C and the ridge optical waveguide 5 and the separation distance in the X-axis direction between the central portion ground electrode component 512C and the ridge optical waveguide 5 can be set to be, for example, 1 µm or more and 160 µm or less. A portion of each of the central portion ground electrode component 511C and the central portion ground electrode component 512C overlaps the wide portion 7W as seen in a planar view.

By using the optical modulator 500 according to this embodiment, it becomes easy to attain impedance matching between an external device for supplying the modulation signal and the optical modulator 500, based on the same reasons as in the optical modulator 100 of the first embodiment, and therefore, high-speed modulation becomes possible.

Further, according to the optical modulator 500 according to this embodiment, the central portion ground electrode component 511C and the central portion ground electrode component 512C are spaced apart from the ridge optical waveguide 5 in the X-axis direction on the principal surface 3S of the base body section 3, and therefore, there is the advantage that it becomes easy to reduce the capacity between the signal electrode 7 and the first and second ground electrodes 511 and 512 and to increase the characteristic impedance of the modulation electrode. This embodiment can be simplistically considered as being equivalent to a parallel circuit of a capacitor in which the ridge optical waveguide 5 and the base body section 3 are interposed between the signal electrode 7 and the central portion ground electrode component 511C, a capacitor in which the ridge optical waveguide 5 and the base body section 3 are interposed between the signal electrode 7 and the central portion ground electrode component 512C, a capacitor in which an air layer is interposed between the signal electrode 7 and the central portion ground electrode component 511C, and a capacitor in which an air layer is interposed between the signal electrode 7 and the central portion ground electrode component 512C.

Considering the configuration in this manner, an increase in the separation distance between the ridge optical waveguide 5 and each of the central portion ground electrode component 511C and the central portion ground electrode component 512C on the principal surface 3S of the base body section 3 is equivalent to an increase the separation distance between the capacitors, and therefore, the configuration directly contributes to a decrease in the capacity between the signal electrode 7 and the first and second ground electrodes 511 and 512 and an increase in the characteristic impedance of the modulation electrode. However, the separation distance between the ridge optical waveguide 5 and each of the central portion ground electrode component 511C and the central portion ground electrode component 512C on the principal surface 3S of the base body section 3 directly affects an effective electric field in the ridge optical waveguide 5. For this reason, in a case where the same voltage is applied between the signal electrode 7 and the ground electrode component, the larger the separation distance becomes, the smaller the effective electric field in the ridge optical waveguide 5 becomes, and therefore, drive efficiency as an optical modulator is reduced. For this reason, it is necessary to design the separation distance while taking into account necessary drive efficiency and the magnitude of characteristic impedance.

Sixth Embodiment

Figure 11:
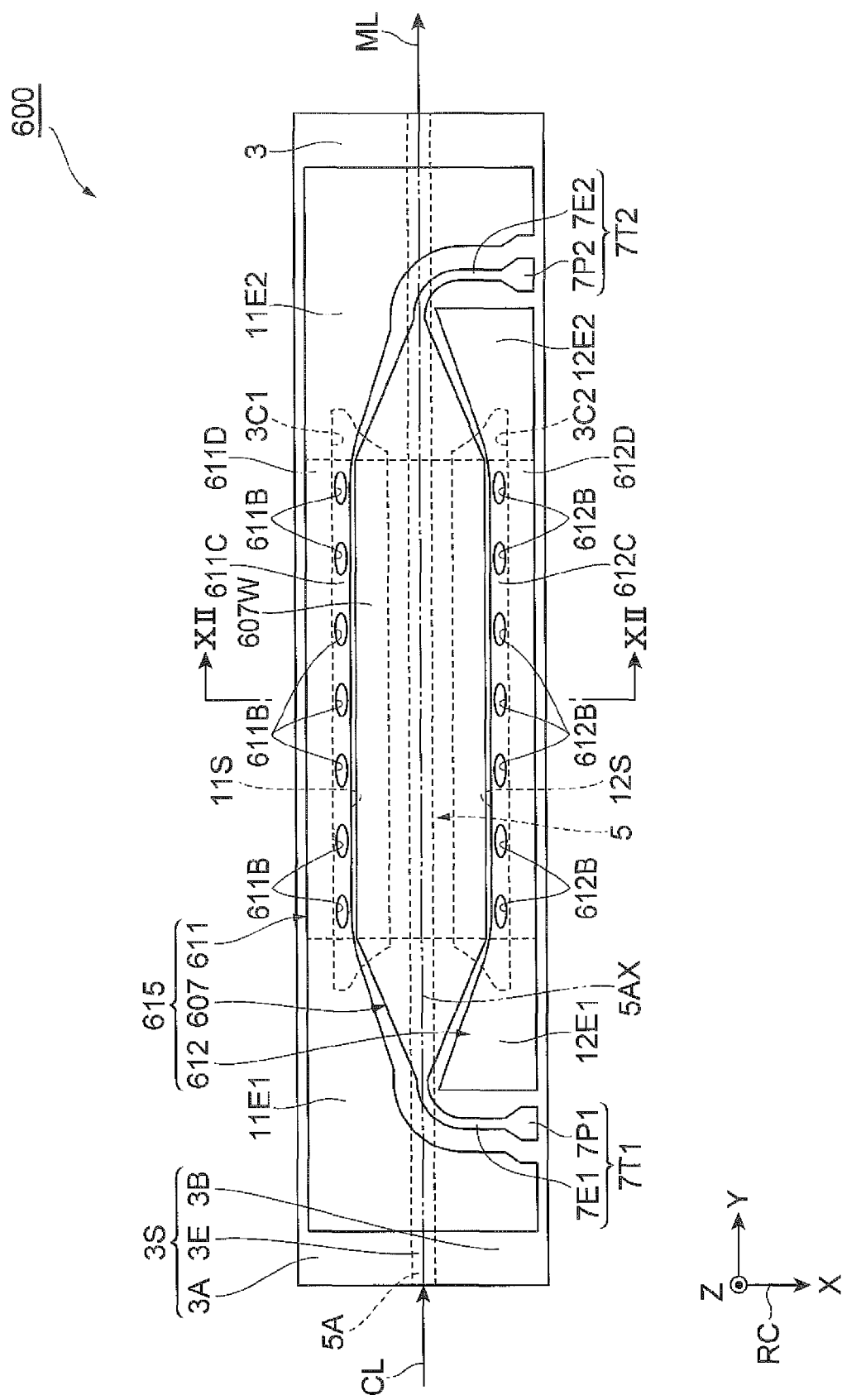
FIG. 11 is a plan view showing the configuration of an optical modulator according to a sixth embodiment.
Figure 12:
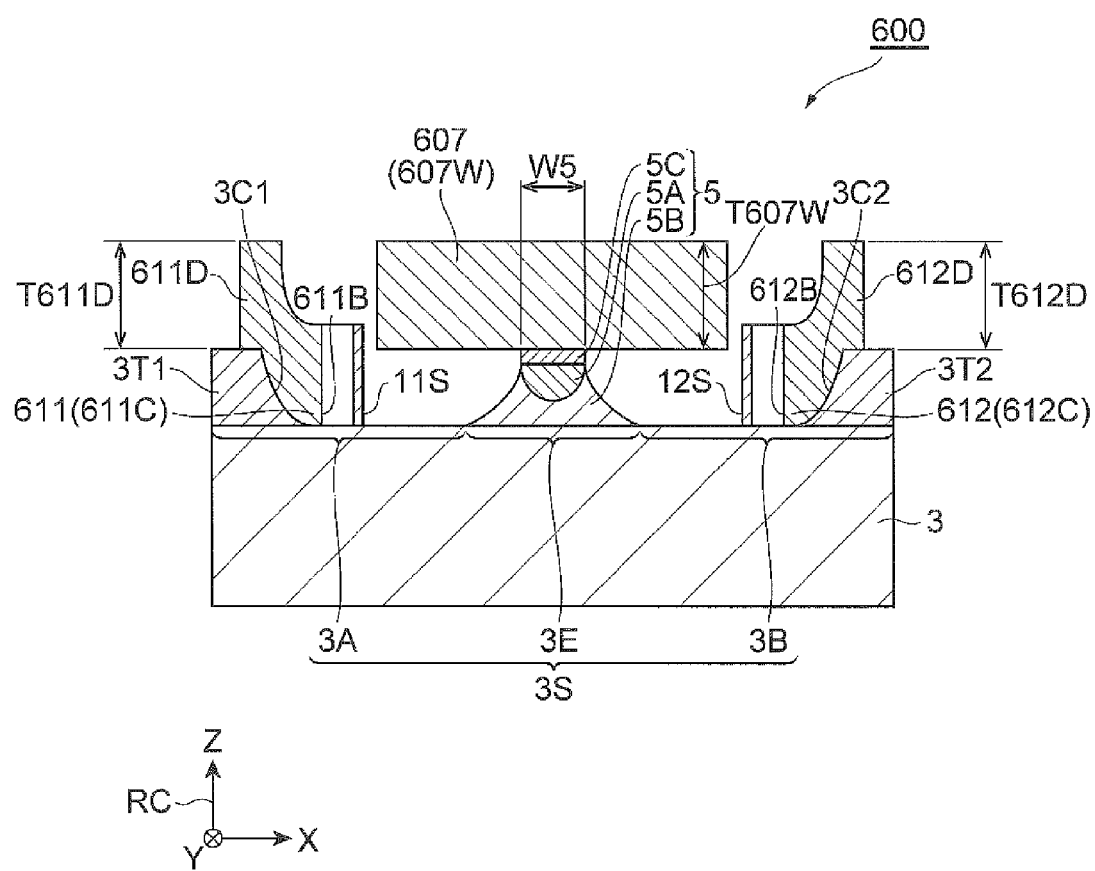
FIG. 12 is a cross-sectional view of the optical modulator taken along line IX-IX of FIG. 11.

Next, a sixth embodiment of the present invention will be described. FIG. 11 is a plan view showing the configuration of an optical modulator according to the sixth embodiment, and FIG. 12 is a cross-sectional view of the optical modulator taken along line XII-XII of FIG. 11. An optical modulator 600 of the sixth embodiment is different from the optical modulator 400 of the fourth embodiment in terms of an aspect of the modulation electrode.

Specifically, as shown in FIGS. 11 and 12, a modulation electrode 615 of this embodiment has a first ground electrode 611, a second ground electrode 612, and a signal electrode 607. A central portion ground electrode component 611C that the first ground electrode 611 has, and a central portion ground electrode component 612C that the second ground electrode 612 has do not overlap the signal electrode 607 of the modulation electrode 615 as seen in a planar view, unlike the central portion ground electrode components 11C and 12C (refer to FIGS. 8 and 9) of the fourth embodiment. For this reason, a first through-hole 611B and a second through-hole 612B provided in the central portion ground electrode component 611C and the central portion ground electrode component 612C also do not overlap a wide portion 607W of the signal electrode 607 as seen in a planar view.

The modulation electrode 615 has the wide portion 607W as a wide portion of this embodiment, and the first ground electrode 611 has an on-terrace ground electrode component 611D as an on-terrace ground electrode component of this embodiment, and the central portion ground electrode component 611C. The second ground electrode 612 has an on-terrace ground electrode component 612D as an on-terrace ground electrode component of this embodiment, and the central portion ground electrode component 612C. Further, the thicknesses along the Z-axis direction of the wide portion 607W, the on-terrace ground electrode component 611D, and the on-terrace ground electrode component 612D are thicker than the thicknesses along the Z-axis direction of the wide portion 7W, the on-terrace ground electrode component 11D, and the on-terrace ground electrode component 12D of the fourth embodiment. Further, in this embodiment, each of the thickness in the Z-axis direction of the central portion ground electrode component 611C and the thickness in the Z-axis direction of the central portion ground electrode component 612C is larger than the height T5 of the ridge optical waveguide 5.

The wide portion 607W of the signal electrode 607 may not have a rectangular shape configuring an overhang shape as shown in FIG. 12, and even with an elliptical shape, a shape which extends in a gradually overhanging inverted trapezoidal shape, as shown in Non-Patent Literature No. 2, a shape overhanging in a mushroom shape, an intermediate shape between these, or a hybrid shape of these two shapes, the same effect can be obtained. Further, the portion installed on the first surface 3A of the on-terrace ground electrode component 611D and the portion installed on the second surface 3B of the on-terrace ground electrode component 612D are made to be thinner than the portion installed on the terrace, but may be configured to be thicker than the portion. It is also possible to make the thicknesses of the portions installed on the first surface 3A and the portion installed on the second surface 3B be substantially the same thickness as a thickness T611D along the Z-axis direction on the upper surface of the first terrace section 3T1 of the on-terrace ground electrode component 611D and a thickness T612D along the Z-axis direction on the upper surface of the second terrace section 3T2 of the on-terrace ground electrode component 612D.

In a case where the thicknesses of the wide portion 607W of the signal electrode 607 and the on-terrace ground electrode components 611D and 612D are thick, as in the sixth embodiment, the value of the characteristic impedance of the modulation electrode greatly depends on the separation distance between each of the central portion ground electrode components 611C and 612C and the ridge optical waveguide 5, and the shape of the wide portion 607W, in particular, the shape of the side overhanging in the X-axis direction of the wide portion 607W, rather than the shape, the size, the position, and the number of each of the first through-hole 611B and the second through-hole 612B. The adjustment of the characteristic impedance by the shape, the size, the position, and the number of each of the first through-hole 611B and the second through-hole 612B is effective. However, this is a secondary consideration.

Therefore, in order to greatly increase the characteristic impedance of the modulation electrode, first, it is favorable if the separation distance between each of the central portion ground electrode components 611C and 612C and the ridge optical waveguide 5 is increased. However, the separation distance between each of the central portion ground electrode components 611C and 612C and the ridge optical waveguide 5 has a trade-off relationship with the strength of an electric field in the ridge optical waveguide 5. For this reason, if the separation distance is increased, the strength of an electric field in the ridge optical waveguide 5 is lowered, and thus efficient modulation cannot be realized. Therefore, by designing the separation distance between each of the central portion ground electrode components 611C and 612C and the ridge optical waveguide 5 with modulation efficiency prioritized over impedance, it is possible to perform a design such that a desired characteristic value is obtained after adjusting and correcting an impedance characteristic which is too low according to the shape, the size, the position, the number, and the like of each of the first through-hole 611B and the second through-hole 612B. In this way, the optical modulator having good characteristics can be realized.

Further, in the case of the sixth embodiment, even if the separation distance between each of the central portion ground electrode components 611C and 612C and the ridge optical waveguide 5 is large and the first through-hole 611B and the second through-hole 612B are provided in the central portion ground electrode components 611C and 612C, the loss of a high-frequency control signal is small, and therefore, there is almost no adverse effect on other characteristics due to the first through-hole 611B and the second through-hole 612B. In this manner, the advantage in the design and manufacturing of a high-frequency optical modulator and a broadband optical modulator is great.

The thickness T607W along the Z-axis direction of the wide portion 607W can be set to be, for example, 25 μm or more and 80 μm or less. Each of the thickness T611D along the Z-axis direction on the upper surface of the first terrace section 3T1 of the on-terrace ground electrode component 611D and the thickness T612D along the Z-axis direction on the upper surface of the second terrace section 3T2 of the on-terrace ground electrode component 612D can be set to be, for example, 25 μm or more and 80 μm or less. In this way, an effective surface area in which the wide portion 607W and the central portion ground electrode components 611C and 612C face each other is significantly increased, and thus the concentration of an electric field on a specific location is avoided and the propagation loss of a control signal is significantly reduced.

The thickness T607W can be set to be, for example, four times or more and ten times or less the width W5 of the ridge optical waveguide 5, or two times or more and five times or less a width in the X-axis direction of the wide portion 607W. Each of the thickness T611D and the thickness T612D can be set to be, for example, the same as the thickness T607W.

By using the optical modulator 600 according to this embodiment, it becomes easy to attain impedance matching between an external device for supplying the modulation signal and the optical modulator 600, based on the same reasons as in the optical modulator 100 of the first embodiment, and therefore, high-speed modulation becomes possible. As a method of adjusting characteristic impedance, although the method is auxiliary, since it is not accompanied by degradation of other characteristics, it is practically effective.

Further, according to the optical modulator 600 according to this embodiment, the thicknesses of the wide portion 607W, the on-terrace ground electrode component 611D, and the on-terrace ground electrode component 612D are thicker than the thicknesses of the corresponding elements in other embodiments, and the effective surface area in which the wide portion 607W of the signal electrode 607 and the central portion ground electrode components 611C and 612C face each other is specifically made to be large. For this reason, the effect in which the concentration of an electric field on a specific location is avoided and the propagation loss of a control signal is significantly reduced is exhibited. In a case where gold, silver or copper in which a signal propagation loss is less is used as a material of the central portion ground electrode components 611C and 612C, at a frequency of 10 GHz or more, a skin depth on which an electric current is concentrated due to a skin effect becomes 1 μm or less, and thus a skin loss becomes significant. In a case of performing drive by a control signal which includes such a high-frequency component, the effect that is exhibited by the optical modulator 600 of the sixth embodiment in which it is possible to greatly increase the effective surface area is great.

Further, it also becomes easy to form the on-terrace ground electrode components 611D and 612D and the wide portion 607W in the same height, and thus it is easy to perform a characteristic inspection using high-frequency probes of wire bonding, flip chip bonding, and ground-signal-ground (GSG) types when packaging a modulator chip in a case.

The present invention is not limited to the embodiments described above, and various modifications are possible. For example, in the respective embodiments described above, the plurality of first through-holes 11B, 211B, 311B, and 611B are respectively spaced apart from the side surfaces 11S on the ridge optical waveguide 5 side of the central portion ground electrode components 11C, 211C, 311C, and 611C in the X-axis direction as seen in a planar view (refer to FIGS. 1, 4, 6, 8, and 11). However, the first through-holes 11B, 211B, 311B, and 611B may be in contact with the side surfaces 11S on the ridge optical waveguide 5 side of the central portion ground electrode components 11C, 211C, 311C, and 611C as seen in a planar view.

Similarly, in the respective embodiments described above, the second through-holes 12B, 212B, 312B, and 612B are respectively spaced apart from the side surfaces 12S on the ridge optical waveguide 5 side of the central portion ground electrode components 12C, 212C, 312C, and 612C in the X-axis direction as seen in a planar view (refer to FIGS. 1, 4, 6, 8, and 11). However, the second through-holes 12B, 212B, 312B, and 612B may be in contact with the side surfaces 12S on the ridge optical waveguide 5 side of the central portion ground electrode components 12C, 212C, 312C, and 612C as seen in a planar view.

Further, in the respective embodiments described above, the plurality of first through-holes 11B, 211B, 311B, and 611B are provided at intervals in order along the Y-axis direction (refer to FIGS. 1, 4, 6, 8, and 11). However, the first through-holes 11B, 211B, 311B, and 611B may be provided without regular intervals. Similarly, further, in the respective embodiments described above, the plurality of second through-holes 12B, 212B, 312B, and 612B are provided at intervals in order along the Y-axis direction (refer to FIGS. 1, 4, 6, 8, and 11). However, the second through-holes 12B, 212B, 312B, and 612B may be provided without regular intervals.

Further, in the respective embodiments described above, the central portion ground electrode components 11C, 211C, 311C, and 611C of the first ground electrodes 11, 211, 311, and 611 have the plurality of first through-holes 11B, 211B, 311B, and 611B (refer to FIGS. 1, 4, 6, 8, and 11). However, each of the central portion ground electrode components 11C, 211C, 311C, and 611C may have only one first through-hole. Similarly, in the respective embodiments described above, the central portion ground electrode components 12C, 212C, 312C, and 612C of the second ground electrodes 12, 212, 312, and 612 have the plurality of second through-holes 12B, 212B, 312B, and 612B (refer to FIGS. 1, 4, 6, 8, and 11). However, each of the central portion ground electrode components 12C, 212C, 312C, and 612C may have only one second through-hole.

Further, an aspect in which the features of two or three or more of the respective embodiments described above are combined is also possible. For example, the planar shape of each of the first through-hole 11B and the second through-hole 12B in the optical modulator 100 of the first embodiment may be a shape having corner portions, such as a rectangular shape, as in the first through-hole 311B and the second through-hole 312B in the optical modulator 300 of the third embodiment (refer to FIGS. 1, 4, 6, 8, and 11).

Further, in the optical modulators 100, 200, 300, and 400 of the first to fourth embodiments, the central portion ground electrode components 11C, 211C, and 311C and the central portion ground electrode components 12C, 212C, and 312C may be spaced apart from the ridge optical waveguide 5 in the X-axis direction on the principal surface 3S of the base body section 3, as in the central portion ground electrode components 511C and the central portion ground electrode components 512C of the optical modulator 500 of the fifth embodiment (refer to FIGS. 2, 5, 7, and 9).

Further, in the optical modulators 100, 200, 300, 400, and 500 of the first to fifth embodiments, whether or not the central portion ground electrode components 11C, 211C, 311C, and 511C and the central portion ground electrode components 12C, 212C, 312C, and 512C are made to overlap the wide portion 7W as seen in a planar view can be selected according to the required effect, as in the central portion ground electrode component 611C and the central portion ground electrode component 612C of the sixth embodiment (refer to FIGS. 1, 4, 6, 8, and 11).

Further, each of the optical modulators 100, 200, 300, 400, 500, and 600 of the respective embodiments described above is provided with one set composed of one ridge optical waveguide 5 and one overhang-shaped wide portion 7W or 607W provided on the ridge optical waveguide 5 (refer to FIGS. 1, 4, 6, 8, and 11). However, a plurality of sets maybe provided. In this case, it is possible to apply the present invention to each of the plurality of sets. For example, in an optical modulator which is provided with a Mach-Zehnder type optical waveguide and an overhang-shaped signal electrode corresponding to the wide portion of this application provided thereon, it is possible to apply the present invention to each of two arm optical waveguides of the Mach-Zehnder type optical waveguide.

In the optical modulators of the respective embodiments described above, the wide portion of the signal electrode has a flat planar or rectangular overhang shape overhanging in the X-axis direction from the ridge optical waveguide. However, the wide portion 7W of the signal electrode in the present invention is not limited to that having such a shape. For example, the wide portion of the signal electrode may have a mushroom shape such as a shape which extends in a gradually overhanging inverted trapezoidal shape, as shown in Non-Patent Literature No. 2, or may have an intermediate shape between these or a hybrid shape of these two shapes. Further, in the optical modulators of the respective embodiments described above, in a cross section orthogonal to the Y-axis direction, the wide portion of the signal electrode has a shape which is symmetrical in the second direction (the X-axis direction) with respect to the ridge optical waveguide. However, the wide portion of the signal electrode in the optical modulator according to the present invention is not limited to that having such a shape. For example, in the cross section, the wide portion of the signal electrode may be provided to be biased in either direction (a +X-axis direction or a −X-axis direction) along the second direction with respect to the ridge optical waveguide, may overhang only in either direction with respect to the ridge optical waveguide, or may have, for example, an overhang shape biased in either direction (the +X-axis direction or the −X-axis direction) along the second direction with respect to the ridge optical waveguide, or a mushroom shape in which an overhang along the second direction is asymmetric with respect to the ridge optical waveguide. Further, as shown in the pamphlet of International Publication No. WO2005/089332, in an optical modulator having two ridge optical waveguides extending along a predetermined direction, in a cross section orthogonal to the predetermined direction, a wide portion of a signal electrode may have a shape extending over the ridge optical waveguide on the other side from above the ridge optical waveguide on one side. It is favorable if it is an optical modulator in which a signal electrode has a wide portion having a width larger than the width in the X-axis direction of a ridge optical waveguide, and the techniques described with respect to the respective embodiments described above are particularly effective in an optical modulator having a configuration in which a ground electrode is disposed at a lower position than a signal electrode.

Further, with respect to the optical modulators of the respective embodiments described above, a description has been made on the premise of employing a traveling wave type electrode configuration. In general, the length of an acting portion of a travelling wave type electrode of an optical modulator is long, and thus it is necessary to form a large number of through-holes according to the length of the electrode and the size and the density of the through-holes. An important design specification is characteristic impedance when considering a signal electrode and a ground electrode as lines. On the other hand, in the case of an optical modulator which is driven as a lumped-constant type electrode, the length of an electrode which is formed is generally short. For this reason, the formation of a through-hole is performed by appropriately designing a size, a shape, and the number according to interelectrode capacity corresponding to a drive frequency. In a case where the length and the area of the electrode are small, the number of through-holes which are formed may be small.

The optical modulator of each of the embodiments described above is a phase modulator in which a straight signal electrode is disposed on a straight ridge optical waveguide 5. However, the optical modulator according to the present invention is not limited to an optical modulator having such a configuration. The optical modulator according to the present invention refers to a device for controlling the phase or the propagation mode of propagating light by changing the refractive index of a material via an electro-optic effect (a phenomenon in which a refractive index changes according to an applied electric field, that is, a Pockels effect and an optical Kerr effect), and includes a device for performing control, shaping, or the like of the strength, the phase, the traveling direction, and the mode of light, and a light pulse by combining controls of the phase and mode of propagating light.

REFERENCE SIGNS LIST

3: base body section
3S: principal surface of base body section
3A: first surface of principal surface
3B: second surface of principal surface
3E: installation surface of principal surface
5: ridge optical waveguide
7: signal electrode 11: first ground electrode
11C: central portion ground electrode component (first ground electrode component)
12: second ground electrode
12C: central portion ground electrode component (second ground electrode component)
11B: first through-hole
12B: second through-hole
15: modulation electrode

The invention claimed is:

1. An optical modulator comprising:
a base body section having a principal surface;
a ridge optical waveguide provided on the principal surface of the base body section and extending along a first direction along the principal surface; and
a modulation electrode for modulating light guided through the ridge optical waveguide,
wherein the principal surface of the base body section has an installation surface on which the ridge optical waveguide is provided, and first and second surfaces which are located so as to interpose the installation surface therebetween along a second direction orthogonal to the first direction and along the principal surface,
wherein the modulation electrode is composed of a signal electrode to which a modulation signal is supplied, a first ground electrode, and a second ground electrode,
wherein the signal electrode has a wide portion being a portion provided on the ridge optical waveguide so as to extend along the first direction, the wide portion having a width in the second direction wider than a width in the second direction of an uppermost portion of the ridge optical waveguide,
wherein the first ground electrode has a first ground electrode component provided on the first surface so as to extend along the first direction,
wherein the second ground electrode has a second ground electrode component provided on the second surface so as to extend along the first direction,
wherein the first ground electrode component has at least one first through-hole provided in only a portion in the first direction of the first ground electrode component,
wherein the second ground electrode component has at least one second through-hole provided in only a portion in the first direction of the second ground electrode component,
wherein the at least one first through-hole overlaps the wide portion of the signal electrode or faces the wide portion in the second direction as seen in a planar view, and
wherein the at least one second through-hole overlaps the wide portion of the signal electrode or faces the wide portion in the second direction as seen in a planar view.

2. The optical modulator according to claim 1, wherein each of the at least one first through-hole and the at least one second through-hole has a circular shape, an elliptical shape, a racetrack shape, or a rounded rectangle shape, as seen in a planar view.

3. The optical modulator according to claim 1, wherein the first ground electrode component has a plurality of first through-holes,
wherein the plurality of first through-holes are provided in order along the first direction,
wherein the second ground electrode component has a plurality of second through-holes, and
wherein the plurality of second through-holes are provided in order along the first direction.

4. The optical modulator according to claim 1, wherein the at least one first through-hole is spaced apart from a side surface on the ridge optical waveguide side of the first ground electrode component as seen in a planar view, and
wherein the at least one second through-hole is spaced apart from a side surface on the ridge optical waveguide side of the second ground electrode component as seen in a planar view.

5. The optical modulator according to claim 4, wherein the at least one first through-hole is spaced apart from the side surface on the ridge optical waveguide side of the first ground electrode component by 2 μm or more as seen in a planar view, and
wherein the at least one second through-hole is spaced apart from the side surface on the ridge optical waveguide side of the second ground electrode component by 2 μm or more as seen in a planar view.

6. The optical modulator according to claim 1, wherein the first ground electrode component and the second ground electrode component are provided substantially line-symmetrically with respect to an optical axis of the ridge optical waveguide as seen in a planar view.

* * * * *